US012608304B2

(12) United States Patent
Cho et al.

(10) Patent No.: US 12,608,304 B2
(45) Date of Patent: Apr. 21, 2026

(54) STORAGE DEVICE INCLUDING MIGRATION MANAGER, OPERATING METHOD THEREOF, AND STORAGE SYSTEM INCLUDING THE SAME

(71) Applicant: SAMSUNG ELECTRONICS CO., LTD., Suwon-si (KR)

(72) Inventors: Hyunsoo Cho, Suwon-si (KR); Jaesub Kim, Suwon-si (KR); Hyunho Seo, Suwon-si (KR); Yoonsu Jo, Suwon-si (KR); Hanchan Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/227,777

(22) Filed: Jul. 28, 2023

(65) Prior Publication Data

US 2024/0211387 A1     Jun. 27, 2024

(30) Foreign Application Priority Data

Dec. 27, 2022     (KR) ......................... 10-2022-0186385

(51) Int. Cl.
  *G06F 12/02*          (2006.01)
(52) U.S. Cl.
  CPC .................................... *G06F 12/02* (2013.01)
(58) Field of Classification Search
  CPC ...................................................... G06F 12/02
  USPC ........................................................ 711/165
  See application file for complete search history.

(56) References Cited

U.S. PATENT DOCUMENTS

| | | | | |
|---|---|---|---|---|
| 10,152,239 | B1 * | 12/2018 | Tamilmani | .......... G06F 11/1448 |
| 10,268,612 | B1 * | 4/2019 | Bshara | .................... G06F 3/061 |
| 10,275,175 | B2 | 4/2019 | Bandic et al. | |
| 10,628,364 | B2 | 4/2020 | Shim | |
| 11,054,993 | B2 | 7/2021 | Grimsrud et al. | |
| 11,301,152 | B1 | 4/2022 | Sillifant | |
| 11,316,917 | B2 | 4/2022 | Kachare et al. | |
| 11,334,274 | B2 | 5/2022 | Kabra et al. | |
| 11,620,233 | B1 * | 4/2023 | Habusha | ............. G06F 12/0891 |
| | | | | 711/207 |

(Continued)

OTHER PUBLICATIONS

Hansen et al., "Self-migration of operating systems", Proceedings of the 11th workshop on ACM SIGOPS European workshop, Sep. 19, 2004, 7 total pages, https://doi.org/10.1145/1133572.1133616.

(Continued)

*Primary Examiner* — Gautam Sain
(74) *Attorney, Agent, or Firm* — Sughrue Mion, PLLC

(57) ABSTRACT

A storage device for migrating data to a destination storage device is provided. The storage device includes: a memory device; and a memory controller configured to: generate an identification command according to a migration request received from a host, transmit the identification command to the destination storage device, transmit first data stored in the memory device to the destination storage device according to a response signal of the destination storage device, based on whether an input/output (IO) signal indicating an operation to generate second data based on the first data is received from the host, transmit the second data to the destination storage device, and transmit a migration completion signal to the host after completing transmission of the first data and the second data to the destination storage device.

20 Claims, 17 Drawing Sheets

(56) References Cited

U.S. PATENT DOCUMENTS

| | | | |
|---|---|---|---|
| 2016/0112514 A1* | 4/2016 | Prakash Usgaonkar ..................... H04L 45/306 709/217 | |
| 2018/0006896 A1* | 1/2018 | Macnamara .......... G06F 3/0647 | |
| 2018/0225288 A1* | 8/2018 | Shivam ................... H04L 67/06 | |
| 2019/0250845 A1* | 8/2019 | Kabra ................. G06F 13/1673 | |
| 2020/0319812 A1 | 10/2020 | He et al. | |
| 2022/0075560 A1 | 3/2022 | Segev et al. | |
| 2022/0187992 A1 | 6/2022 | Malakapalli et al. | |
| 2022/0187999 A1* | 6/2022 | Lam ..................... G06F 3/0625 | |
| 2022/0197532 A1 | 6/2022 | Muthiah et al. | |

OTHER PUBLICATIONS

Ruprecht et al., "VM Live Migration At Scale", Proceedings of the 14th ACM SIGPLAN/SIGOPS International Conference on Virtual Execution Environments, Mar. 25, 2018, 13 total pages.
Bates et al., "Enabling the NVMe™ CMB and PMR Ecosystem", NVM Express, May 1, 2018, 13 total pages.

* cited by examiner

| NMP | NDP | state |
|-----|-----|-------|
| P1 | | |
| P2 | NDP1 | ○ |
| P3 | | |
| P4 | NDP3 | ○ |
| P5 | | |
| P6 | | |
| P7 | NDP2 | ○ |
| ... | ... | ... |
| PN | | |

STORAGE DEVICE INCLUDING MIGRATION MANAGER, OPERATING METHOD THEREOF, AND STORAGE SYSTEM INCLUDING THE SAME

CROSS-REFERENCE TO RELATED APPLICATION

This application is based on and claims priority to Korean Patent Application No. 10-2022-0186385, filed on Dec. 27, 2022, in the Korean Intellectual Property Office, the disclosure of which is incorporated by reference herein in its entirety.

BACKGROUND

The present disclosure relates to a storage device including a migration manager, an operating method thereof, and a storage system including the same, and more particularly, to a method of migrating data to a destination storage device through the migration manager included in the storage device.

Service providers that use cloud computing to provide services may migrate data (e.g., data related to the provided service) stored in one storage device to another storage device in the process of maintaining hardware and software. In order to minimize or eliminate service interruption during such migration, live migration technology may be introduced. In addition, in order for a host to provide service even while the migration operation between storage devices is in progress, the latest data with changes reflected during the migration operation may also need to be migrated.

When the host controls the overall live migration operation between the storage devices, resource usage (e.g., a central processing unit (CPU) or a memory) of the host may increase because the host directly intervenes in the entire process of moving data between the storage devices.

A storage device may exchange information with another storage device connected thereto through a bus, where data may be exchanged via peer-to-peer (P2P) without involving the host. Through this P2P migration, the resource usage of the host may be reduced.

SUMMARY

One or more example embodiments provide a storage device for migrating data with minimal host intervention when the storage device migrates data to another storage device.

Example embodiments are not limited to those mentioned above, and other aspects not mentioned will be clearly understood by those skilled in the art from the following description.

According to an aspect of an example embodiment, a method of operating a storage device including a migration manager, includes: receiving a migration request from a host; transmitting an identification command to a destination storage device based on the migration request; transmitting first data to the destination storage device according to a response signal of the destination storage device; based on an input/output (IO) signal indicating an operation to generate second data based on the first data being received from the host while the first data is being transmitted, transmitting the second data to the destination storage device; and transmitting a migration completion signal to the host after completing transmission of the first data and the second data to the destination storage device.

According to another aspect of an example embodiment, a storage device for migrating data to a destination storage device, includes: a memory device; and a memory controller configured to: generate an identification command according to a migration request received from a host, transmit the identification command to the destination storage device, transmit first data stored in the memory device to the destination storage device according to a response signal of the destination storage device, based on whether an input/output (IO) signal indicating an operation to generate second data based on the first data is received from the host, transmit the second data to the destination storage device, and transmit a migration completion signal to the host after completing transmission of the first data and the second data to the destination storage device.

According to another aspect of an example embodiment, a storage system includes: a first storage device; a second storage device; and a host, wherein the first storage device includes: a memory device; and a memory controller configured to: generate an identification command according to a migration request received from the host, transmit the identification command to the second storage device through the host, transmit first data stored in the first storage device to the second storage device through the host according to a response signal of the second storage device, based on whether an input/output (IO) signal indicating an operation to generate second data based on the first data is received from the host, transmit the second data to the second storage device, and transmit a migration completion signal to the host after transmission of the first data and the second data is completed. The first data and the second data are transmitted through the host.

BRIEF DESCRIPTION OF DRAWINGS

Embodiments will be more clearly understood from the following description of example embodiments, taken in conjunction with the accompanying drawings in which:

FIGS. 4A, 4B and 4C are diagrams illustrating source data, dirty data, and a log table according to an example embodiment;

DETAILED DESCRIPTION

Figure 1:
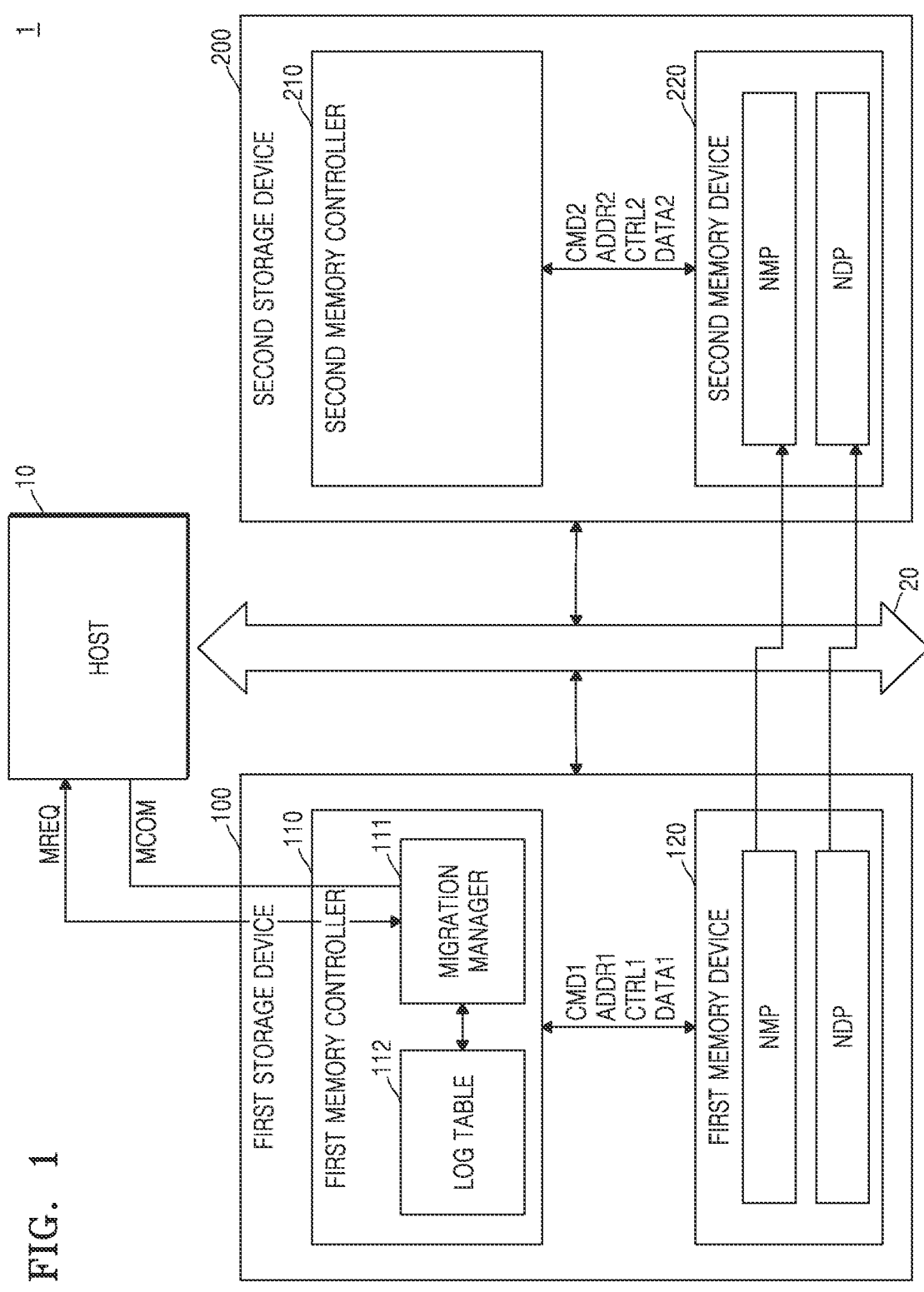
FIG. 1 is a block diagram of a storage system according to an example embodiment.

Hereinafter, example embodiments will be described in detail with reference to the accompanying drawings. When describing with reference to the drawings, the same or corresponding components are assigned the same reference numerals, and duplicate descriptions thereof will be omitted.

FIG. 1 is a block diagram of a storage system 1 according to an example embodiment.

Referring to FIG. 1, the storage system 1 may include a host 10, a bus 20, a first storage device 100, and a second storage device 200. Hereinafter, the first storage device 100 may be referred to as a source storage device. The second storage device 200 may be referred to as a destination storage device.

The host 10 may be a data processing device. The host 10 may execute an operating system (OS) and/or various application programs. For example, the host 10 may be implemented as a system-on-a-chip (SoC). The host 10 may control data processing operations of the storage system 1. The host 10 may include a processor and a memory. The host 10 may include at least one processor. For example, the host 10 may include a multi-core processor.

The processor may include a central processing unit (CPU), a digital signal processor (DSP), a graphics processing unit (GPU), an application processor (AP), a communication processor (CP), an encryption processing unit, a physics processing unit, a machine learning processing unit, and the like. The processor may perform a data operation using the memory.

The memory of the host 10 may store data to be programmed into the first storage device 100 or the second storage device 200, or data read from the first storage device 100 or the second storage device 200. In addition, software including various programs related to functions of the host 10 may be loaded into the memory of the host 10. As an example, programs, such as an OS, a file system, etc., may be loaded into the memory of the host 10. For example, the memory of the host 10 may be implemented as random access memory (RAM), read only memory (ROM), electronically erasable programmable read only memory (EE-PROM), flash memory, or other memory technology.

The host 10 may communicate with the first storage device 100 and the second storage device 200 through at least one channel. An interface used for communication between the host 10 and the first and second storage devices 100 and 200 may be determined according to rules or specifications. For example, the host 10 may communicate with the first storage device 100 and the second storage device 200 through the bus 20.

The bus 20 may operate based on one of a variety of bus protocols. The variety of bus protocols may include at least one of an advanced microcontroller bus architecture (AMBA) protocol, a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a mobile industry processor interface (MIPI) protocol, a universal flash storage (UFS) protocol, a non-volatile memory express over fabrics (NVMe-oF) protocol, etc.

In an example embodiment, the host 10, the first storage device 100, and the second storage device 200 may be electrically connected to the bus 20. In an example embodiment, a migration request MREQ of the host 10 may include connection information of the second storage device 200. The first storage device 100 may access the second storage device 200 using the connection information of the second storage device 200 included in the migration request MREQ. However, this is provided as an example and example embodiments are not limited thereto. For example, the connection information of the second storage device 200 may be information previously input to the first storage device 100 or information received from the second storage device 200, and the first storage device 100 may access the second storage device 200 without receiving the connection information from the host 10.

In an example embodiment, the host 10, the first storage device 100, and the second storage device 200 may communicate through the bus 20, and the bus 20 may operate based on the PCI-E protocol or the NVMe-oF protocol.

In response to the migration request MREQ of the host 10, the first storage device 100 may perform an operation (i.e., migration operation) of transmitting source data NMP and dirty data NDP stored in the first storage device 100 to the second storage device 200. The first storage device 100 may include a first memory controller 110 and a first memory device 120. In an example embodiment, the source data NMP and the dirty data NDP may be divided into several pieces of data and transmitted to the second storage device 200.

In an example embodiment, the source data NMP may refer to original data to be migrated. Hereinafter, the source data NMP may be referred to as first data and a namespace mapped page.

In an example embodiment, while the source data NMP is transmitted from the first storage device 100 to the second storage device 200, the host 10 may transmit an input/output (IO) request signal to the first storage device 100. The first storage device 100 may perform a corresponding operation in response to a request of the host 10. As a result, all or part of the source data NMP may be changed. Data newly generated in this process may be referred to as dirty data NDP. The dirty data NDP may include at least one dirty page. Hereinafter, the dirty data NDP may be referred to as second data and a namespace dirty page.

In an example embodiment, the source data NMP and the dirty data NDP may be transmitted from the first storage device 100 to the second storage device 200 without (or with minimal) intervention of the host 10 according to a protocol negotiated between the first storage device 100 and the second storage device 200. For example, the first storage device 100 may compress and transmit the source data NMP and the dirty data NDP to the second storage device 200.

In response to a program/read request from the host 10, the first memory controller 110 may control the first memory device 120 to read data stored in the first memory device 120 or program data into the first memory device 120. Specifically, the first memory controller 110 may control program, read, and erase operations of the first memory device 120 by providing an address ADDR1, a command CMD1, and a control signal CTRL1 to the first memory device 120. In addition, data for programming DATA1 and reading data DATA1 may be transmitted and received between the first memory controller 110 and the first memory device 120.

The first memory controller 110 may include a migration manager 111 and a log table 112. The migration manager 111 may receive the migration request signal MREQ from the host 10. After data migration from the first storage device 100 to the second storage device 200 is completed, the migration manager 111 may generate and transmit a migration completion signal MCOM to the host 10.

In an example embodiment, the migration request signal MREQ and the migration completion signal MCOM may correspond to at least one of various signal systems between the host 10 and the first storage device 100. For example, the migration request signal MREQ and the migration completion signal MCOM may be electrical signals between the host 10 and the first storage device 100. In addition, for example, the migration request signal MREQ and the migration completion signal MCOM may refer to protocol packets defined in the PCI-E protocol or NVMe-oF protocol. Hereinafter, the migration request signal MREQ and the migration completion signal MCOM may refer to a generalized signal system between the host 10 and the first storage device 100.

In an example embodiment, the first memory controller 110 may further include a command queue. The migration request signal MREQ from the host 10 may be received through the command queue and then transmitted to the migration manager 111. The migration completion signal MCOM generated by the migration manager 111 may be transmitted to the host 10 through the command queue. This is described below with reference to FIGS. 8 and 9.

The migration manager 111 may control the log table 112. The log table 112 may include information on the source data NMP (e.g., address information) and information on the dirty data NDP (e.g., address information). In an example embodiment, while the first storage device 100 transmits the source data NMP to the second storage device 200, the host 10 may transmit the IO request signal to the first storage device 100. The first storage device 100 may perform an operation corresponding to the IO request signal in response to the IO request signal of the host 10. For example, the operation corresponding to the IO request signal may be a read operation, a program operation, or an erase operation of the source data NMP of the first memory device 120. Accordingly, some pages of the source data NMP may be modified, and new dirty data NDP may be generated. The migration manager 111 may update the log table 112 by storing, in the log table 112, the address information of the modified page among the pages included in the source data NMP and the address information of the dirty data NDP. The migration manager 111 may transmit the information of the updated log table 112 and the newly generated dirty data NDP to the second storage device 200 and update the source data NMP previously transmitted to the second storage device 200. In this way, migration reflecting modifications due to IO of the host 10 during data migration may be referred to as live migration.

The first memory device 120 may include the source data NMP and the dirty data NDP. In an example embodiment, the first memory device 120 may include a memory cell array, and the source data NMP and the dirty data NDP may be stored in the memory cell array. The first memory device 120 is described below with reference to FIG. 3.

The second storage device 200 may be configured similarly to the first storage device 100. The second storage device 200 may include a second memory controller 210 and a second memory device 220. The second storage device 200 may receive the source data NMP and the dirty data NDP transmitted from the first storage device 100.

The second memory device 220 of the second storage device 200 may be configured similarly to the first memory device 120 of the first storage device 100.

In response to a write/read request from the host 10 or the first storage device 100, the second memory controller 210 of the second storage device 200 may control the second memory device 220 to read data stored in the second memory device 220 or program data into the second memory device 220. Specifically, the second memory controller 210 may control program, read, and erase operations of the first memory device 120 by providing an address ADDR2, a command CMD2, and a control signal CTRL2 to the second memory device 220. In addition, data for programming DATA2 and reading data DATA2 may be transmitted and received between the second memory controller 210 and the second memory device 220.

The second memory controller 210 of the second storage device 200 may be configured similarly to the first memory controller 110 of the first storage device 100. For example, the second memory controller 210 of the second storage device 200 may include a migration manager and a log table. In this case, the second storage device 200 may perform peer-to-peer (P2P) migration of data to the first storage device 100 without (or with minimal) intervention of the host 10.

As described above, according to an example embodiment, the first storage device 100 may receive the migration request signal MREQ from the host 10, and may control a migration operation of the source data NMP to the second storage device 200 through the migration manager 111 in response to the migration request signal MREQ. As a result, resource usage of the host 10 may be reduced and performance of the storage system 1 may be improved. Specifically, the amount of computations of the processor of the host 10 may be reduced, and the amount of memory usage of the host 10 may also be reduced. In addition, because the memory usage of the host 10 is reduced, the memory bandwidth of the host 10 may not be limited. That is, by transmitting data between the storage devices regardless of the limitation of the memory bandwidth of the host 10, data may be transmitted quicker and data transmission efficiency may also be improved.

Figure 2:
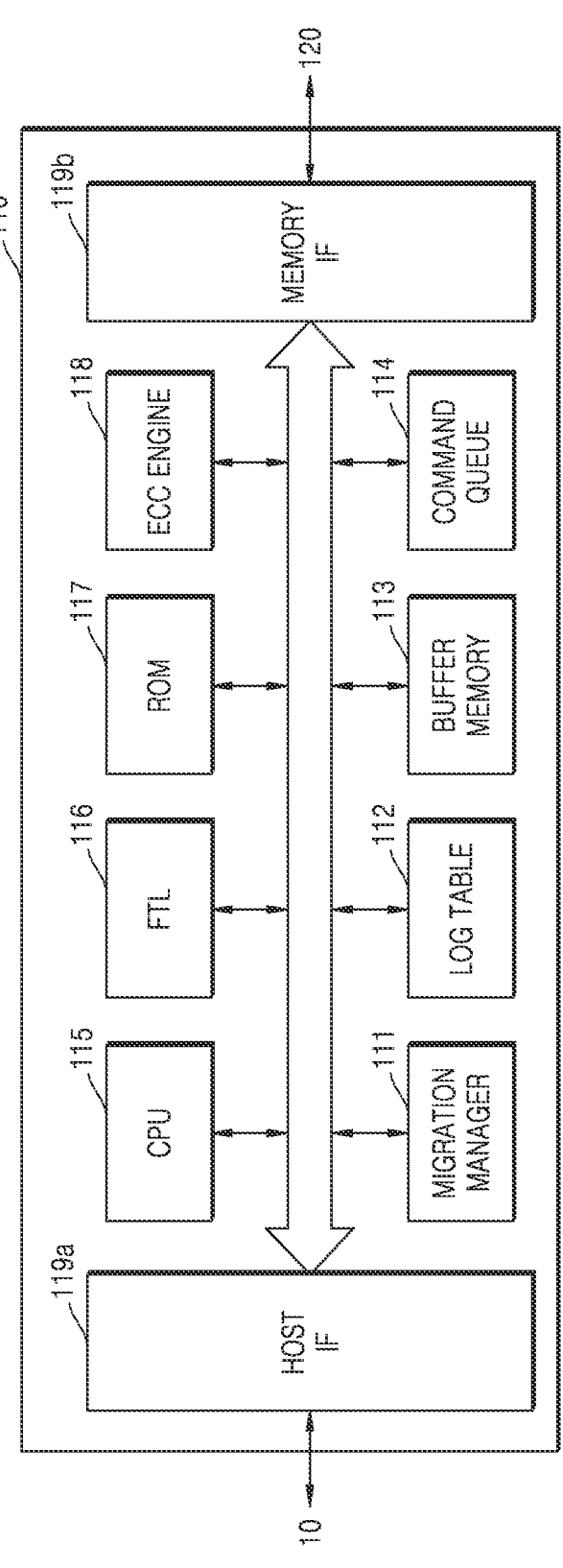
FIG. 2 is a block diagram of a memory controller according to an example embodiment.

FIG. 2 is a block diagram of a memory controller according to an example embodiment. FIG. 2 will be described with reference to FIG. 1, and redundant description may be omitted.

The first memory controller 110 may include a migration manager 111, a log table 112, a buffer memory 113, a command queue 114, a CPU 115, a flash translation layer (FTL) 116, ROM 117, an ECC (Error Correction Code) engine 118, a host interface 119a, and a memory interface 119b. In an example embodiment, the first memory controller 110 may further include a controller memory buffer (CMB), and the buffer memory 113 and the command queue 114 may be areas allocated to the CMB.

The migration manager 111 may control data of the first storage device 100 to be migrated to a destination storage device based on the migration request signal MREQ received from the host 10.

The migration manager 111 may generate an identification command based on the migration request signal MREQ. The migration manager 111 may transmit the generated identification command to the destination storage device.

When data migration from the first storage device 100 to the destination storage device is completed, the migration manager 111 may generate and transmit the migration completion signal MCOM to the host 10.

The log table 112 may be a table for recording data logs while data is transmitted from the first storage device 100 to the second storage device 200 in order to transmit, to the second storage device 200, data changed by an operation based on the IO request signal provided by the host 10 to the first storage device 100.

The buffer memory 113 may temporarily store data to be written to the first memory device 120 or data to be read from the first memory device 120.

In an example embodiment, the buffer memory 113 may be provided in the first memory controller 110, but example embodiments are not limited thereto and the buffer memory 113 may also be provided outside the first memory controller 110.

In an example embodiment, a part or all of the buffer memory 113 may be a non-volatile memory. In this case, a region corresponding to the non-volatile memory may be referred to as a persistent memory region (PMR).

The command queue 114 may receive the migration request signal MREQ from the host 10. The migration manager 111 may transmit the identification command to the second storage device 200 based on the migration request signal MREQ input to the command queue 114.

When transmission of data from the first storage device 100 to the second storage device 200 is completed, the migration manager 111 may generate and input the migration completion signal MCOM to the command queue 114. The migration manager 111 may transmit the migration completion signal MCOM to the host 10 through the command queue 114. In an example embodiment, the command queue 114 may have a circular queue structure and may include two queues. For example, the first queue may receive a command or a request from the host 10, and the second queue may transmit a command or a response to the host 10. The first queue may be referred to as a submission queue, and the second queue may be referred to as a completion queue.

The CPU 115 may control the overall operation of the first storage device 100. Specifically, the CPU 115 may decode a command received from the host 10 and control the first storage device 100 to perform an operation according to the decoding result. The CPU 115 may execute firmware loaded in the ROM 117 so that various functions, including garbage collection, address mapping, wear leveling, etc., are performed in the FTL 116 for managing the memory device (e.g., 120 in FIG. 1).

The FTL 116 may perform various functions such as address mapping, wear leveling, and garbage collection. The address mapping operation is an operation of changing a logical address received from the host 10 into a physical address used to actually store data in the first memory device 120. The wear leveling is a technique for preventing excessive deterioration of a specific memory block by uniformly using memory blocks (BLK1 to BLKz in FIG. 3) in the first memory device 120, and may illustratively be implemented through firmware technology that balances program/erase counts of physical blocks. The garbage collection is a technique for securing usable capacity in the first memory device 120 by copying valid data of a block to a new memory block and then erasing the existing memory block.

The ROM 117 may be ROM that stores programs executed by the CPU 115. A program realizing an operating method of the first memory controller 110 or firmware in which the program is recorded may be stored in the ROM 117.

The ECC engine 118 may perform error detection and correction functions on read data read from the first memory device 120. More specifically, the ECC engine 118 may generate parity bits for data to be programmed into the first memory device 120, and the generated parity bits may be stored in the first memory device 120 with the program data. When data is read from the first memory device 120, the ECC engine 118 may correct an error in the read data by using the parity bits read from the first memory device 120 together with the read data, and output the error-corrected read data.

The host interface 119a may transmit and receive packets to and from the host 10. A packet transmitted from the host 10 to the host interface 119a may include a command or data to be recorded in the first memory device 120, and a packet transmitted from the host interface 119a to the host 10 may include a response to the command or data read from the first memory device 120.

The memory interface 119b may transmit data to be written in the first memory device 120 to the first memory device 120 or may receive data read from the first memory device 120. This memory interface 119b may be implemented to comply with standard protocols such as Toggle or ONFI.

Figure 3:
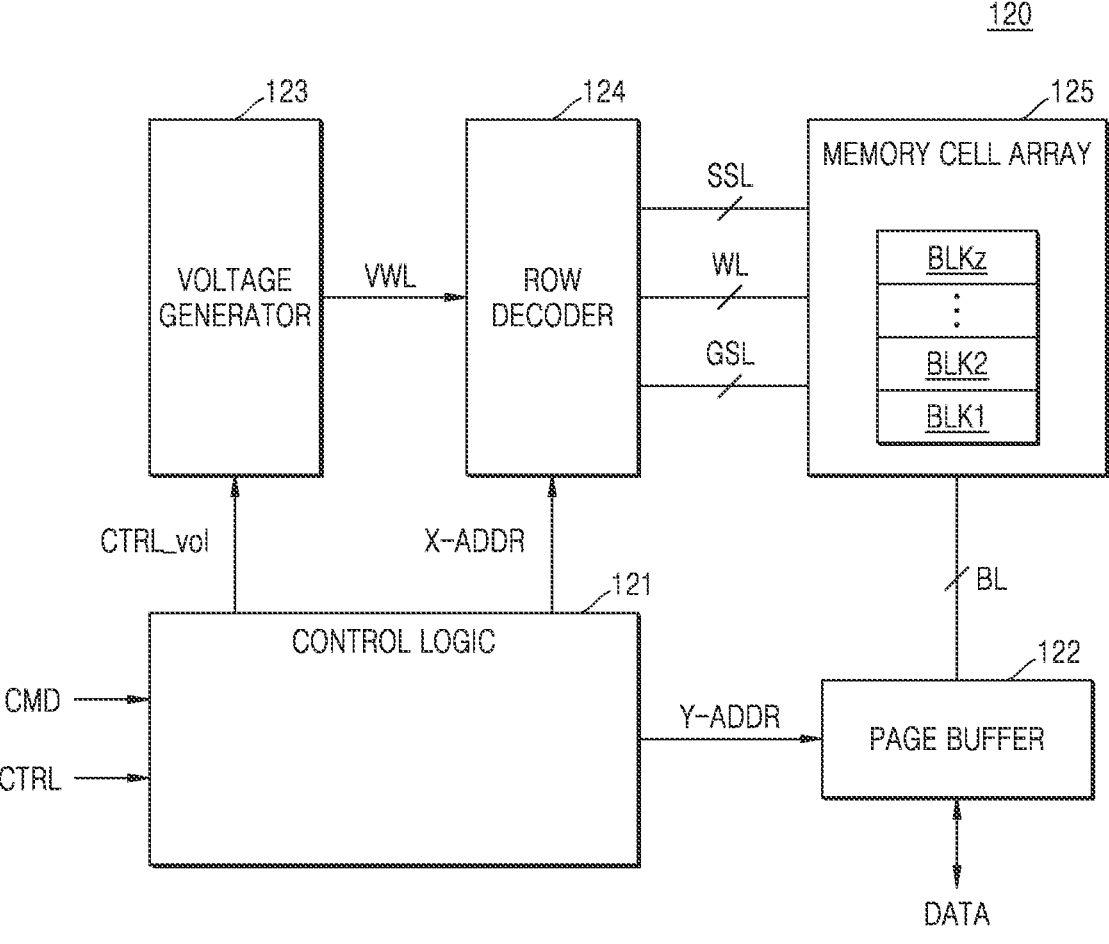
FIG. 3 is a block diagram of a memory device according to an example embodiment.

FIG. 3 is a block diagram of a memory device according to an example embodiment. Specifically, FIG. 3 illustrates an implementation example of the first memory device 120 of FIG. 1.

Referring to FIG. 3, the first memory device 120 may include a control logic 121, a page buffer 122, a voltage generator 123, a row decoder 124, and a memory cell array 125. Although not shown in FIG. 2, the first memory device 120 may further include various other components related to memory operations, such as a data IO circuit or an IO interface.

The control logic 121 may output various internal control signals for programming data into the memory cell array 125 or reading data from the memory cell array 125 based on the command CMD1, the address ADDR1, and the control signal CTRL1 received from the first memory controller 110. For example, the control logic 121 may output a voltage control signal CTRL_vol for controlling the levels of various voltages generated by the voltage generator 123. The control logic 121 may provide a row address X-ADDR to the row decoder 124 and may provide a column address Y-ADDR to the page buffer 122.

The page buffer 122 may operate in response to control of the control logic 121. For example, the page buffer 122 may operate as a write driver or a sense amplifier. In an example embodiment, during a program operation, the page buffer 122 may operate as a write driver to apply voltages corresponding to data DATA to be stored in the memory cell array 125 to bit lines BL. In an example embodiment, during a read operation, the page buffer 122 may operate as a sense amplifier to sense data DATA stored in the memory cell array 125.

The voltage generator 123 may generate various voltages used in the first memory device 120. For example, the voltage generator 123 may generate a program voltage, a read voltage, a program verification voltage, an erase voltage, and the like as a word line voltage VWL.

The row decoder 124 may select at least one of word lines of the selected memory block in response to the row address X-ADDR.

The memory cell array 125 including a plurality of memory cells may be connected to word lines WL, string selection lines SSL, ground selection lines GSL, and bit lines BL. The memory cell array 125 may be connected to the row decoder 124 through the word lines WL, the string selection lines SSL, and ground selection lines GSL, and may be connected to the page buffer 122 through the bit lines BL.

For example, the plurality of memory cells included in the memory cell array 125 may be non-volatile memory cells that retain stored data even when power is cut off. Specifically, when the memory cells are non-volatile memory cells, the first memory device 120 may include electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), etc. Hereinafter, example embodiments are described taking as an example a case in which the plurality of memory cells are NAND flash memory cells, but it will be understood example embodiments are not limited thereto.

The memory cell array 125 may include a plurality of memory blocks BLK1 to BLKz, and each memory block BLK1 to BLKz may have a planar structure or a three-dimensional structure. The memory cell array 125 may include at least one of a single-level cell block including single-level cells (SLC), a multi-level cell block including multi-level cells (MLC), and a triple-level cell block including triple-level cells, and a quad-level cell block including quad-level cells. For example, some of the plurality of memory blocks BLK1 to BLKz may be SLC blocks, and the other memory blocks may be MLC blocks, triple-level cell blocks, or quad-level cell blocks.

In an example embodiment, the second memory device 220 of FIG. 1 may also be configured similar to the first memory device 120 of FIG. 1.

Figure 4A:
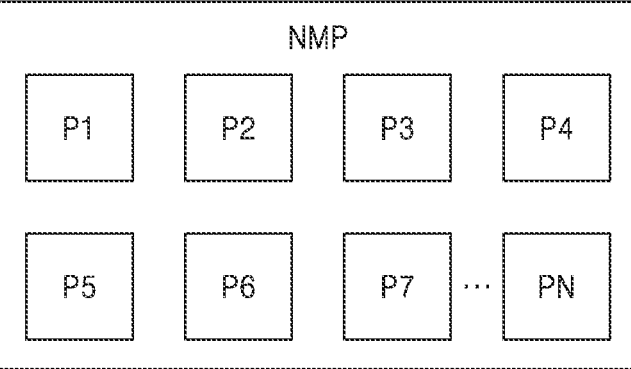
Figure 4B:
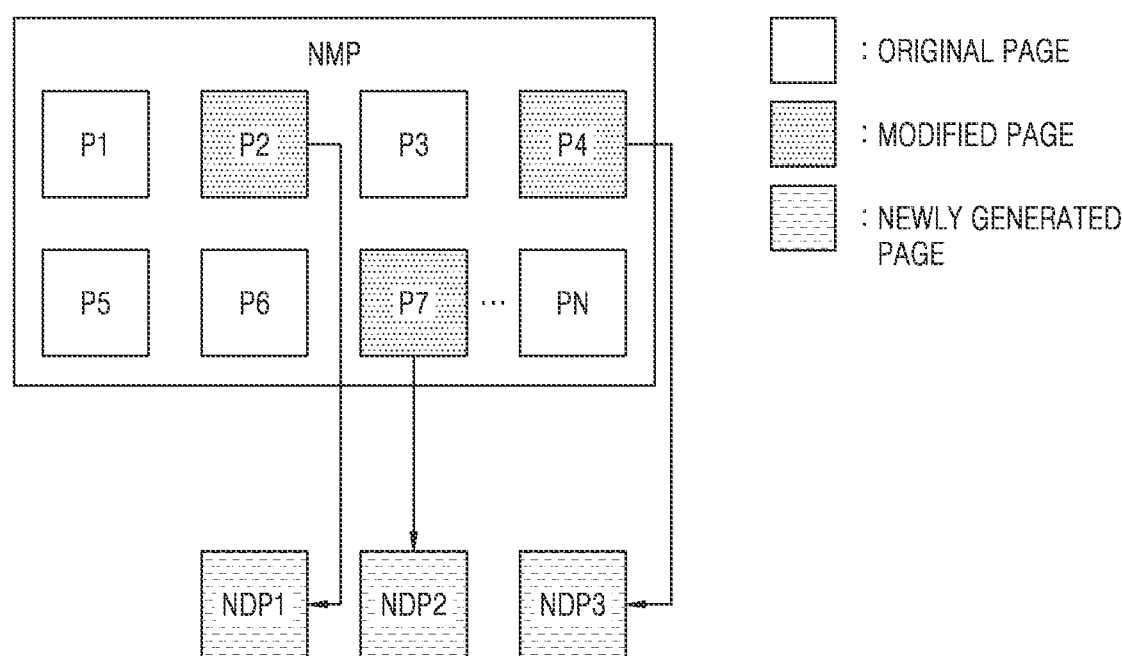

FIGS. 4A to 4C are diagrams illustrating source data NMP, dirty data NDP, and a log table according to an example embodiment.

Specifically, FIG. 4A is a diagram illustrating source data NMP according to an example embodiment. FIG. 4B is a diagram illustrating dirty data NDP according to an example embodiment. FIG. 4C is a diagram illustrating a log table according to an example embodiment. Hereinafter, it is assumed that the source data NMP and the dirty data NDP are transmitted from the first storage device 100 to the second storage device 200.

Referring to FIG. 4A, the source data NMP may include a plurality of pages. For example, the source data NMP may include a first page P1 to an N$^{th}$ page PN, where N is a natural number greater than 1.

When the migration manager 111 of the first storage device 100 receives the migration request signal MREQ from the host 10, the migration manager 111 may control a state of the source data NMP to be migrated to be recorded in the log table 112.

In an example embodiment, the migration manager 111 may receive, from the host 10, the migration request signal MREQ for migrating the data of the first page P1 to the N$^{th}$ page PN, which is data of the plurality of pages constituting the source data NMP, to the second storage device 200. At this time, states of the first page P1 to the N$^{th}$ page PN may be recorded in the log table 112. That is, the migration manager 111 may track whether or not the source data NMP is changed from the time of receiving the migration request signal MREQ from the host 10. For example, part or all of the source data NMP may be changed due to an IO request of the host 10, and the migration manager 111 may reflect and record the changed values in the log table 112.

Referring to FIG. 4B, it is shown that part of the source data NMP is changed due to the IO request of the host 10.

While the source data NMP is transmitted to the second storage device 200, the host 10 may make an IO request to the first storage device 100. At this time, the first storage device 100 may perform an operation corresponding to the IO request signal transmitted by the host 10 in response to the request of the host 10. Due to this operation, part or all of the first data NMP may be changed.

In an example embodiment, due to the IO request of the host 10, data stored in the second page P2, the fourth page P4, and the seventh page P7 may be changed. At this time, dirty pages corresponding to the changed pages, i.e., a first dirty page NDP1, a second dirty page NDP2, and a third dirty page NDP3, may be newly created and stored in the first storage device 100. The second page P2, the fourth page P4, and the seventh page P7 may be referred to as modified pages. For example, the modified second page P2 may be the first dirty page NDP1. The modified fourth page P4 may be the third dirty page NDP3. The modified seventh page P7 may be the second dirty page NDP2.

Referring to FIG. 4C, when the source data NMP is changed due to the IO of the host 10, the log table 112 may be updated to indicate such changes. The log table 112 may include address information of the first page P1 to the N$^{th}$ page PN included in the source data NMP and state information indicating whether each page has been changed. The log table 112 may include address information of the first dirty page NDP1, the second dirty page NDP2, and the third dirty page NDP3 included in the dirty data NDP.

In an example embodiment, the log table 112 records changes in the source data NMP as shown in FIG. 4C. For example, the second page P2, the fourth page P4, and the seventh page P7 may be changed due to the IO request of the host 10, and the fact that the second page P2 and the fourth page P4 and the seventh page P7 are changed may be updated to the state information of the log table 112. A new page corresponding to the change in the second page P2 may be the first dirty page NDP1, and address information of the first dirty page NDP1 may be updated in the log table 112. A new page corresponding to the change in the fourth page P4 may be the third dirty page NDP3, and address information of the third dirty page NDP3 may be updated in the log table 112. A new page corresponding to the change in the seventh page P7 may be the second dirty page NDP2, and address information of the second dirty page NDP2 may be updated in the log table 112.

Figure 5A:
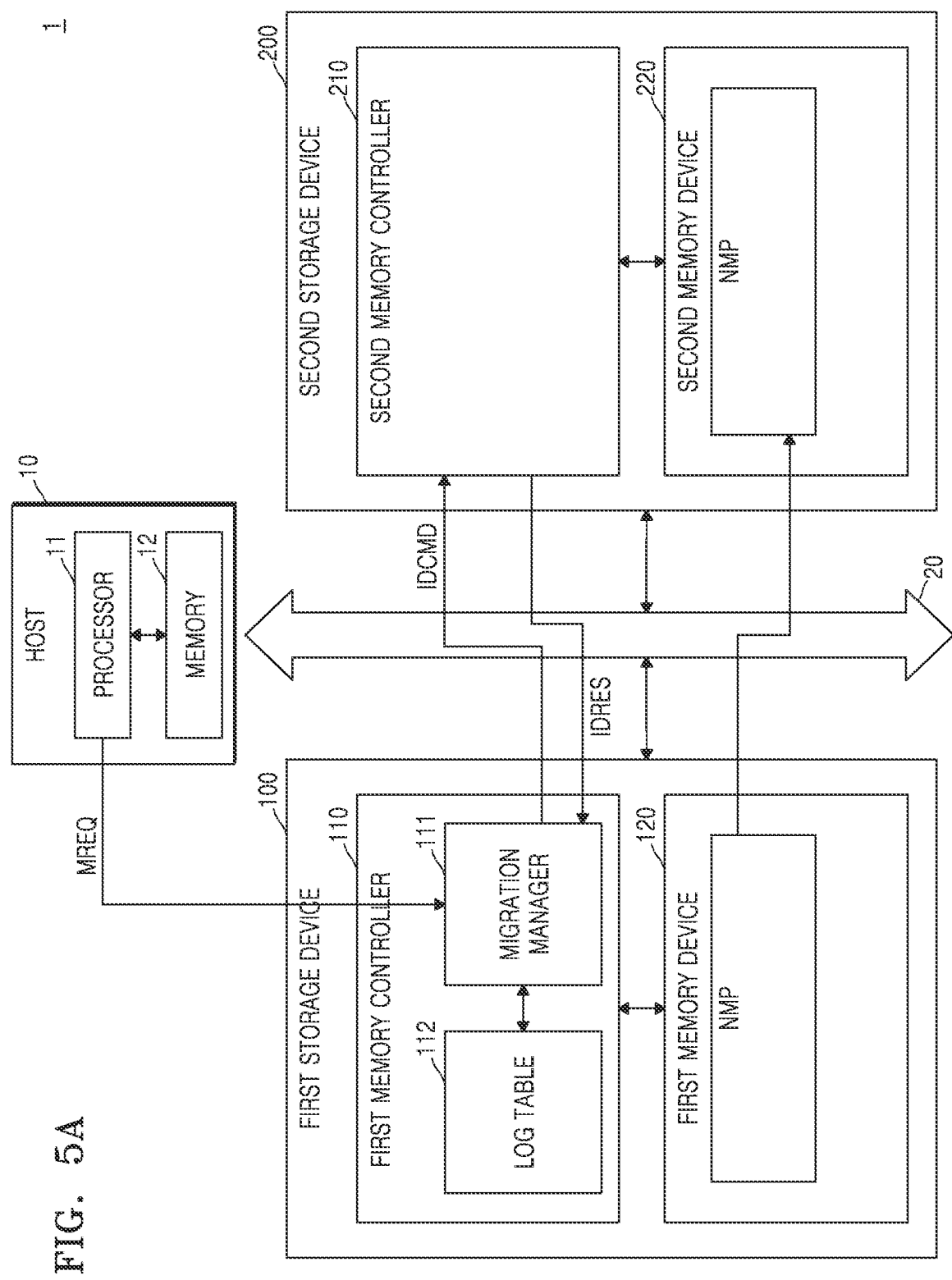
FIGS. 5A, 5B and 5C are block diagrams illustrating data migration between storage devices according to an example embodiment.
Figure 5B:
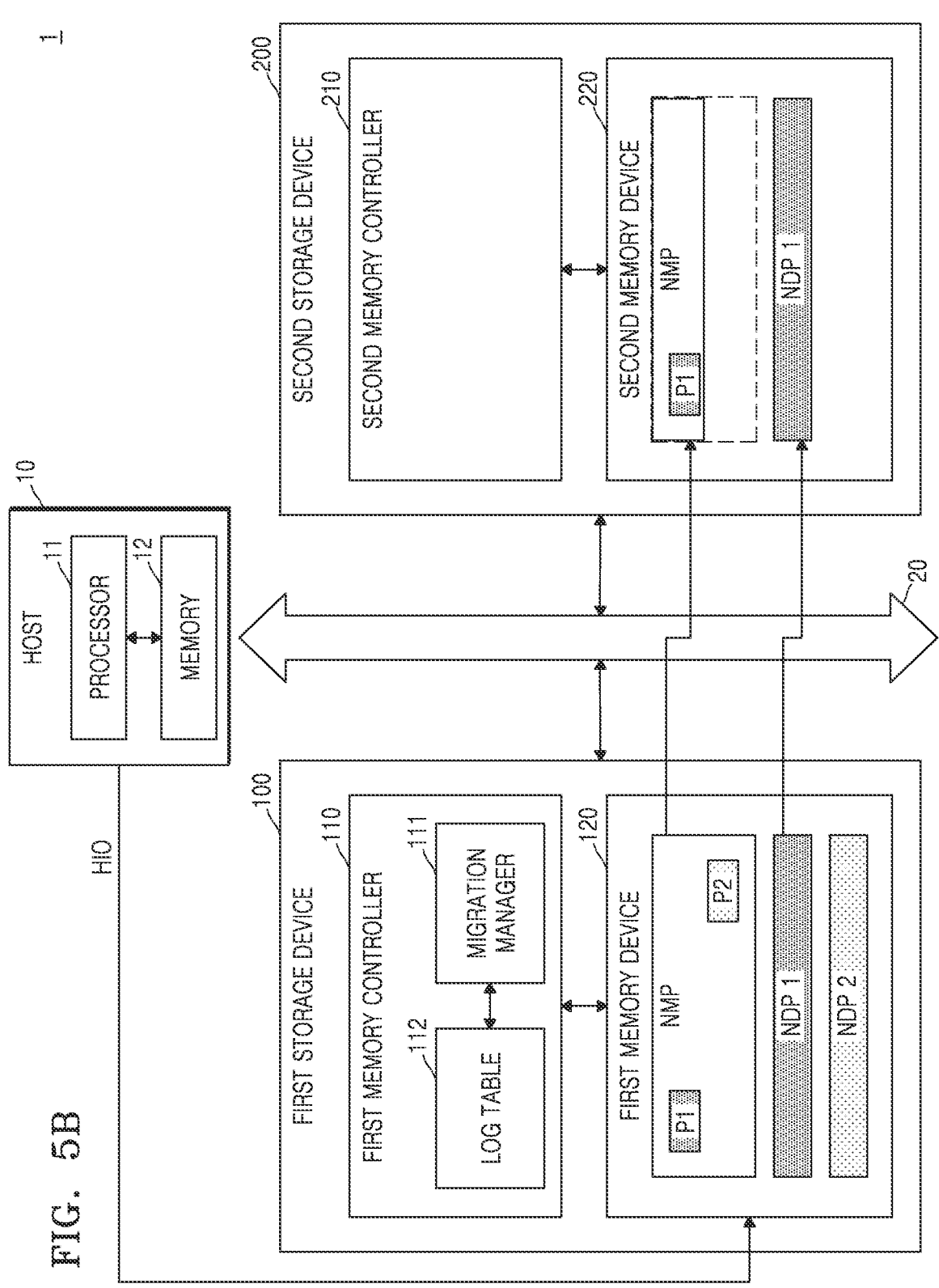
Figure 5C:
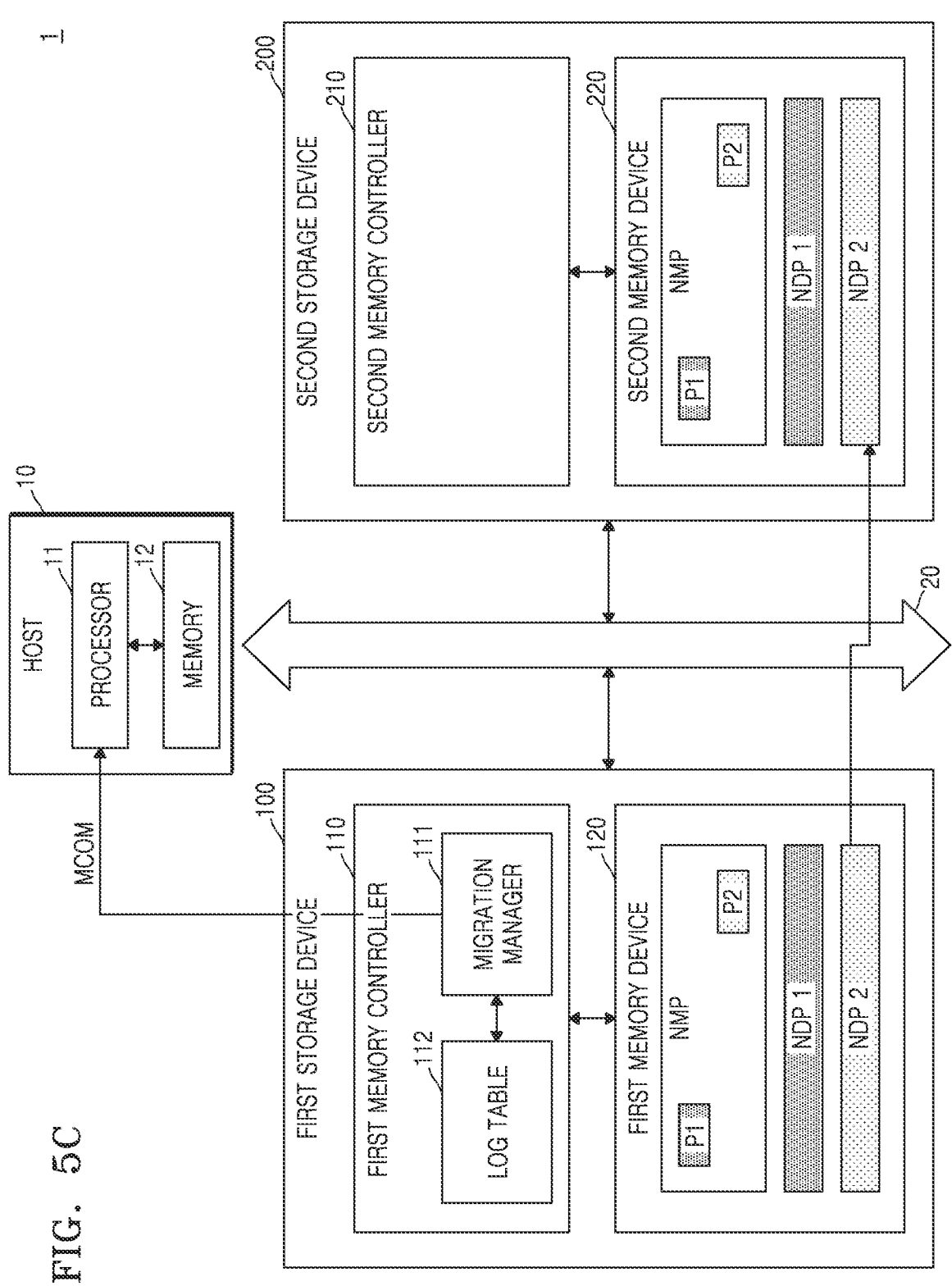

FIGS. 5A to 5C are block diagrams illustrating data migration between storage devices according to an example embodiment. Specifically, FIGS. 5A to 5C are diagrams illustrating the process of transmitting dirty data NDP to the second storage device 200 when part of the source data NMP is changed due to an IO request of the host 10 to the first storage device 100 while the source data NMP is transmitted from the first storage device 100 to the second storage device 200. FIGS. 5A to 5C will be described with reference to FIG. 1, and redundant descriptions may be omitted.

FIG. 5A is a diagram showing the migration request signal MREQ being transmitted from the host 10 to the first storage device 100, which causes data migration from the first storage device 100 to the second storage device 200 to start.

Referring to FIG. 5A, the host 10 may include a processor 11 and a memory 12. The processor 11 of the host 10 may transmit the migration request signal MREQ to the first memory controller 110.

The migration manager 111 included in the first memory controller 110 may receive the migration request signal MREQ from the processor 11 of the host 10. In an example embodiment, the migration request signal MREQ may include an identifier indicating the source storage device, an identifier indicating the destination storage device, an identifier indicating a command queue included in the first storage device 100 and the second storage device 200, and an address of the source data NMP stored in the first storage device 100. For example, the identifier indicating the source storage device may indicate the first storage device 100. For example, the identifier indicating the destination storage device may be an identifier indicating the second storage device 200.

The migration manager 111 may transmit the identification command IDCMD to the second storage device 200 in response to the migration request signal MREQ from the host 10. The identification command IDCMD may include an identifier indicating the destination storage device included in the migration request signal MREQ. In an example embodiment, the second memory controller 210 of the second storage device 200 may receive the identification command IDCMD from the migration manager 111.

The migration manager 111 may receive the response signal IDRES from the second storage device 200. In an example embodiment, the second memory controller 210 of the second storage device 200 may transmit the response signal IDRES based on information included in the identification command IDCMD transmitted by the migration manager 111. For example, when the identifier indicating the destination storage device included in the identification command IDCMD indicates the second storage device 200, the second memory controller 210 may transmit the response signal IDRES to the migration manager 111. As another example, when the identifier indicating the destination storage device included in the identification command IDCMD does not indicate (i.e., does not match the identifier indicating) the second storage device 200, the second memory controller 210 may transmit an error signal or may not transmit any signal to the migration manager 111. As a result, the migration manager 111 may transmit an error signal to the host 10 when the error signal is received from the second storage device 200 or the response signal IDRES is not received from the second storage device 200.

After receiving the migration request signal MREQ from the host 10, the migration manager 111 may track changes in the source data NMP until data migration is completed. In an example embodiment, immediately after receiving the migration request signal MREQ, the migration manager 111 may record the state of the source data NMP in the log table 112. For example, the state of each page of the source data NMP initially recorded in the log table 112 may be a state without any changes. When any changes in the source data NMP due to IO of the host 10 occur while the source data NMP is transmitted from the first storage device 100 to the second storage device 200, the migration manager 111 may record the changes in the log table 112. This is described below with reference to FIGS. 5B and 5C.

FIG. 5B is a diagram illustrating that first dirty page NDP1 is transmitted from the first storage device 100 to the second storage device 200 when any changes in the source data NMP due to IO of the host 10 occur while the source data NMP is transmitted from the first storage device 100 to the second storage device 200. In FIG. 5B, it is assumed that in the source data NMP, transmission of the first page P1 is completed, but transmission of the second page P2 is not. FIGS. 5B and 5C show that two dirty pages, that is, the first dirty page NDP1 and the second dirty page NDP2, are generated, but this is an example and a smaller number of dirty pages or a larger number of dirty pages may be generated.

Referring to FIG. 5B, the host 10 may transmit an IO request signal HIO to the first storage device 100. For example, the IO request signal HIO of the host 10 may include read, program, and erase operations of the first page P1 and the second page P2 of the source data NMP stored in the first memory device 120.

In an example embodiment, when the program operation is performed on the first page P1 and the second page P2, the first dirty page NDP1 and the second dirty page NDP2 may be newly generated and stored in the first memory device 120. When the program operation is performed on the first page P1, a new value corresponding thereto may be programmed into the first dirty page NDP1. When the program operation is performed on the second page P2, a new value corresponding thereto may be programmed into the second dirty page NDP2. When the values of the first page P1 and the second page P2 are changed by programming new data, the migration manager 111 may record such changes in the log table 112. The migration manager 111 may transmit the first dirty page NDP1 and the second dirty page NDP2 to the second storage device 200 based on the information recorded in the log table 112.

In an example embodiment, when the logical erase operation is performed on the first page P1 and the second page P2, the migration manager 111 may record in the log table 112 that the first page P1 and the second page P2 have been erased. Referring to the log table 112, the migration manager 111 may transmit information indicating that the first page P1 and the second page P2 have been erased to the second storage device 200. Accordingly, the second memory controller 210 may erase the first page P1 and the second page P2.

FIG. 5C is a diagram illustrating an operation of the migration manager 111 when transmission of the source data NMP from the first storage device 100 to the second storage device 200 is completed.

Referring to FIG. 5C, the second dirty page NDP2 may be transmitted from the first storage device 100 to the second storage device 200 under control of the migration manager 111.

In an example embodiment, when transmission of the source data NMP, the first dirty page NDP1, and the second dirty page NDP2 is completed, the migration manager 111 may determine that data migration from the first storage device 100 to the second storage device 200 is completed.

When data migration from the first storage device 100 to the second storage device 200 is completed, the migration manager 111 may transmit the migration completion signal MCOM to the host 10. In an example embodiment, the processor 11 of the host 10 may receive the migration completion signal MCOM from the migration manager 111.

Figure 6:
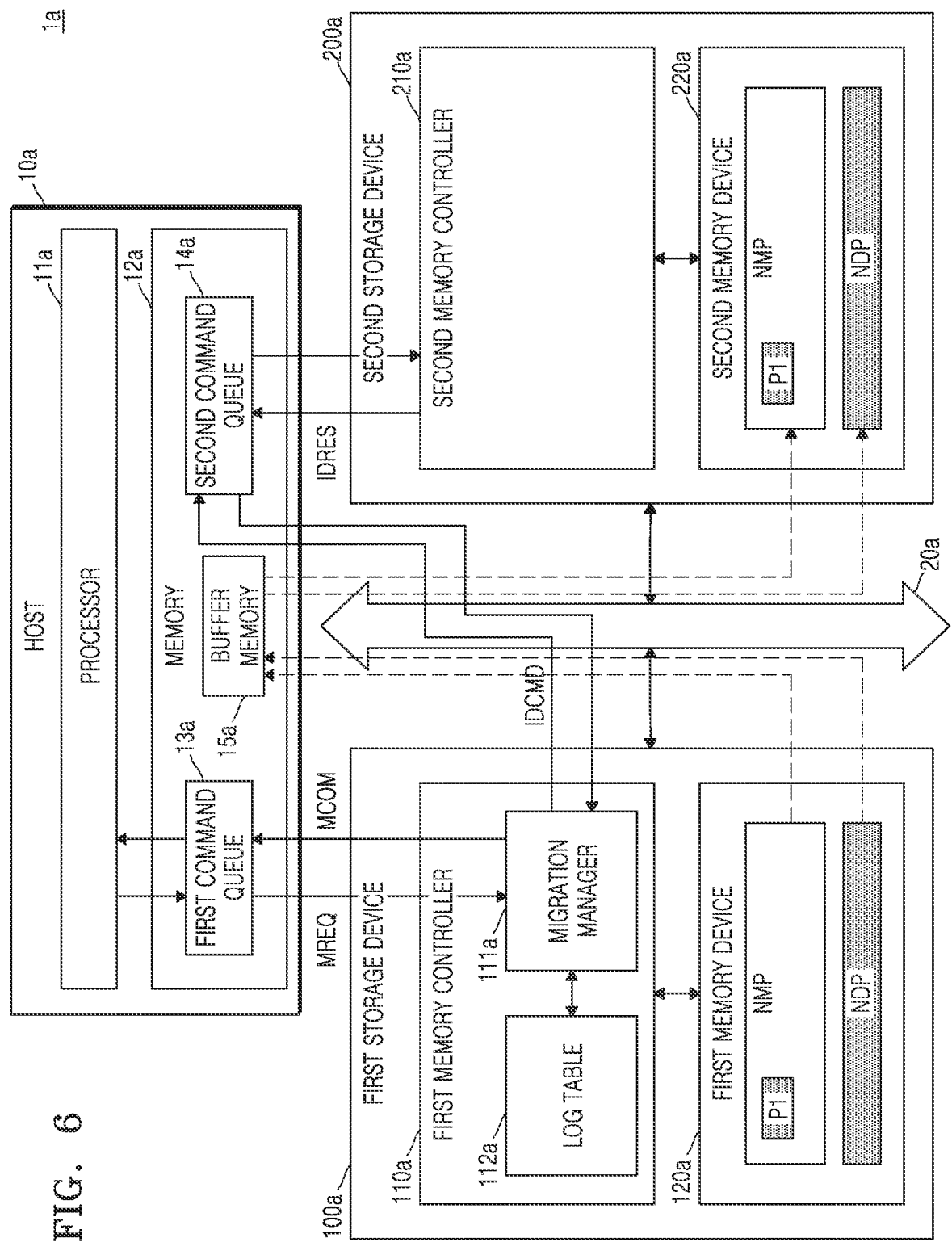
FIG. 6 is a block diagram illustrating data migration between storage devices according to an example embodiment.

FIG. 6 is a block diagram illustrating data migration between storage devices according to an example embodiment. Specifically, a host 10a of FIG. 6 may include a first command queue 13a, a second command queue 14a, and a buffer memory 15a. Source data NMP and dirty data NDP may be migrated from a first storage device 100a to a second storage device 200a through the buffer memory 15a of the host 10a. FIG. 6 will be described with reference to FIGS. 1, 2, and 5A to 5C, and redundant descriptions may be omitted. Hereinafter, suffixes attached to reference numerals (e.g., a in 10a and b in 10b) are for distinguishing between a plurality of circuits having the same function.

FIG. 6 shows that only one piece of dirty data NDP is migrated, but this is an example and no dirty data NDP or more dirty data NDP may be generated according to the IO request signal of the host 10a and may be migrated.

The storage system 1a of FIG. 6 may correspond to the storage system 1 of FIG. 1. The storage system 1a may include the host 10a, a bus 20a, the first storage device 100a, and the second storage device 200a. The bus 20a of FIG. 6 may correspond to the bus 20 of FIG. 1.

The host 10a of FIG. 6 may correspond to the host 10 of FIG. 1. The host 10a may include a processor 11a and a memory 12a. The memory 12a may include the first command queue 13a, the second command queue 14a, and the buffer memory 15a.

The host 10a may generate a migration request signal MREQ in the processor 11a. The host 10a may transmit the migration request signal MREQ to a migration manager 111a through the first command queue 13a. The processor 11a of the host 10a may receive the migration completion signal MCOM generated by the migration manager 111a through the first command queue 13a.

The host 10a may receive the identification command IDCMD from the migration manager 111a through the second command queue 14a, which is transmitted to the second storage device 200a.

The host 10a may receive the response signal IDRES from the second storage device 200a through the second command queue 14a, which is transmitted to the first storage device 100a.

The first storage device 100a may correspond to the first storage device 100 of FIG. 1. The first storage device 100a may include a first memory controller 110a and a first memory device 120a. The first memory controller 110a may correspond to the first memory controller 110 of FIG. 1. The first memory controller 110a may include a log table 112a and the migration manager 111a.

The log table 112a may correspond to the log table 112 of FIG. 1. The migration manager 111a may correspond to the migration manager 111 of FIG. 1. After receiving the migration request signal MREQ from the host 10a, the migration manager 111a may generate the identification command IDCMD based on the received migration request signal MREQ. The migration manager 111a may transmit the identification command IDCMD to the second storage device 200a through the second command queue 14a. The migration manager 111a may receive the response signal IDRES from the second storage device 200a through the second command queue 14a of the host 10a.

The second storage device 200a may correspond to the second storage device 200 of FIG. 1. The second storage device 200a may include a second memory controller 210a and a second memory device 220a. The second memory controller 210a may correspond to the second memory controller 210 of FIG. 1. The second memory device 220a may correspond to the second memory device 220 of FIG. 1.

The identification command IDCMD may be transmitted from the first storage device 100a to the second storage device 200a through the bus 20a. The response signal IDRES may be transmitted from the second storage device 200a to the first storage device 100a through the bus 20a.

The source data NMP may be migrated from the first storage device 100a to the second storage device 200a through the buffer memory 15a of the host 10a.

In an example embodiment, when the migration manager 111a receives the migration request signal MREQ from the host 10a, the migration manager 111a may control the source data NMP of the first storage device 100a to be transmitted to the second memory device 220a of the second storage device 200a through the buffer memory 15a of the host 10a. The source data NMP may be transmitted from the first storage device 100a to the host 10a through the bus 20a. Similarly, the source data NMP may be transmitted from the host 10a to the second storage device 200a through the bus 20a.

In an example embodiment, when the host 10a transmits the IO request signal to the first storage device 100a while the source data NMP is transmitted, the first storage device 100a may perform an operation corresponding to the IO request signal of the host 10a. In this process, the contents of the first page P1 included in the source data NMP may be changed, and dirty data NDP may be generated correspondingly. The migration manager 111a may control the first memory device 120a to transmit the dirty data NDP to the second storage device 200a. The dirty data NDP of the first storage device 100a may be transmitted to the second memory device 220a of the second storage device 200a through the buffer memory 15a of the host 10a and the bus 20a.

Figure 7:
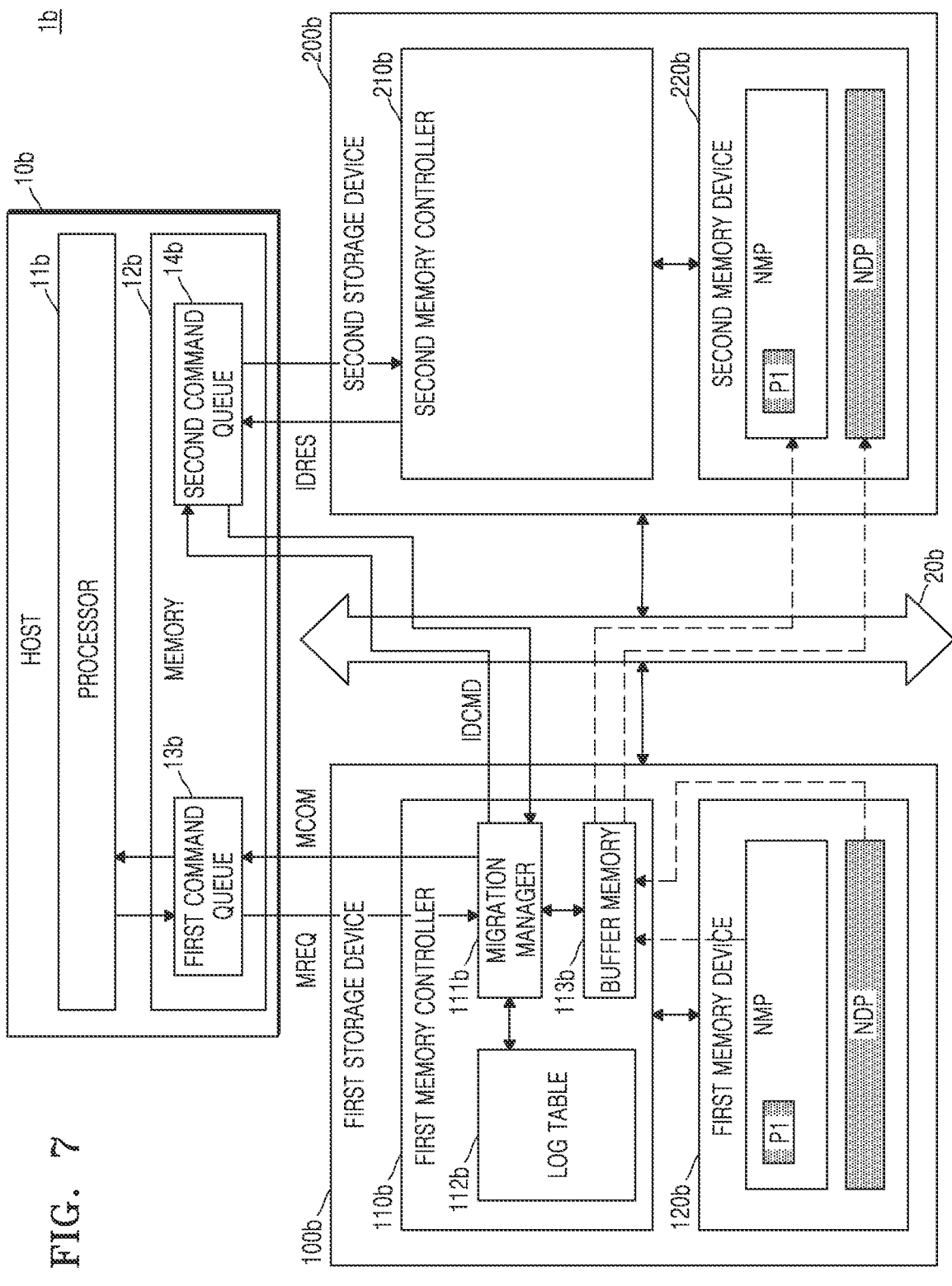
FIG. 7 is a block diagram illustrating data migration between storage devices according to an example embodiment.

FIG. 7 is a block diagram illustrating data migration between storage devices according to an example embodiment. Specifically, the host 10b of FIG. 7 may include a first command queue 13b and a second command queue 14b. The first memory controller 110b of the first storage device 100b may further include a buffer memory 113b. Source data NMP and dirty data NDP may be migrated from the first storage device 100b to the second storage device 200b through the buffer memory 15b of the first memory controller 110b. FIG. 7 will be described with reference to FIGS. 1, 2, and 5A to 5C, and redundant descriptions may be omitted.

FIG. 7 shows that only one piece of dirty data NDP is migrated, but this is an example and no dirty data NDP or more dirty data NDP may be generated according to the IO request signal of the host 10b and may be migrated.

The storage system 1b of FIG. 7 may correspond to the storage system 1 of FIG. 1. The storage system 1b may include a host 10b, a bus 20b, a first storage device 100b, and a second storage device 200b. The bus 20b of FIG. 7 may correspond to the bus 20 of FIG. 1.

The host 10b of FIG. 7 may correspond to the host 10 of FIG. 1. The host 10b may include a processor 11b and a memory 12b. The memory 12b may include a first command queue 13b and a second command queue 14b.

The host 10b may generate a migration request signal MREQ in the processor 11b. The host 10b may transmit the migration request signal MREQ to the migration manager 111b through the first command queue 13b. The processor 11b of the host 10b may receive the migration completion signal MCOM generated by the migration manager 111b through the first command queue 13b.

The host 10b may receive the identification command IDCMD from the migration manager 111b through the second command queue 14b, which is transmitted to the second storage device 200b.

The host 10b may receive the response signal IDRES from the second storage device 200b through the second command queue 14b, which is transmitted to the first storage device 100b.

The first storage device 100b may correspond to the first storage device 100 of FIG. 1. The first storage device 100b may include a first memory controller 110b and a first memory device 120b. The first memory controller 110b may correspond to the first memory controller 110 of FIG. 1. The first memory controller 110b may include a log table 112b and a migration manager 111b.

The log table 112b may correspond to the log table 112 of FIG. 1. The migration manager 111b may correspond to the migration manager 111 of FIG. 1. After receiving the migration request signal MREQ from the host 10b, the migration manager 111b may generate the identification command IDCMD based on the received migration request signal MREQ. The migration manager 111b may transmit the identification command IDCMD to the second storage device 200b through the second command queue 14b. The migration manager 111b may receive the response signal IDRES from the second storage device 200b through the second command queue 14b of the host 10b.

The second storage device 200b may correspond to the second storage device 200 of FIG. 1. The second storage device 200b may include a second memory controller 210b and a second memory device 220b. The second memory controller 210b may correspond to the second memory controller 210 of FIG. 1. The second memory device 220b may correspond to the second memory device 220 of FIG. 1.

The identification command IDCMD may be transmitted from the first storage device 100b to the second storage device 200b through the bus 20b. The response signal IDRES may be transmitted from the second storage device 200b to the first storage device 100b through the bus 20b.

Source data NMP may be migrated from the first storage device 100b to the second storage device 200b through the buffer memory 113b of the first memory controller 110b.

In an example embodiment, when the migration manager 111b receives the migration request signal MREQ from the host 10b, the migration manager 111b may control the source data NMP of the first storage device 100b to be transmitted to the second memory device 220b of the second storage device 200b through the buffer memory 113b of the first memory controller 110b and the bus 20b.

In an example embodiment, when the host 10b transmits the IO request signal to the first storage device 100b while the source data NMP is transmitted, the first storage device 100b may perform an operation corresponding to the IO request signal of the host 10b. In this process, the contents of the first page P1 included in the source data NMP may be changed, and dirty data NDP may be generated correspondingly. The migration manager 111b may control the first memory device 120b to transmit the dirty data NDP to the second storage device 200b. The dirty data NDP of the first storage device 100b may be transmitted to the second memory device 220b of the second storage device 200b through the buffer memory 113b of the first memory controller 110b and the bus 20b.

Figure 8:
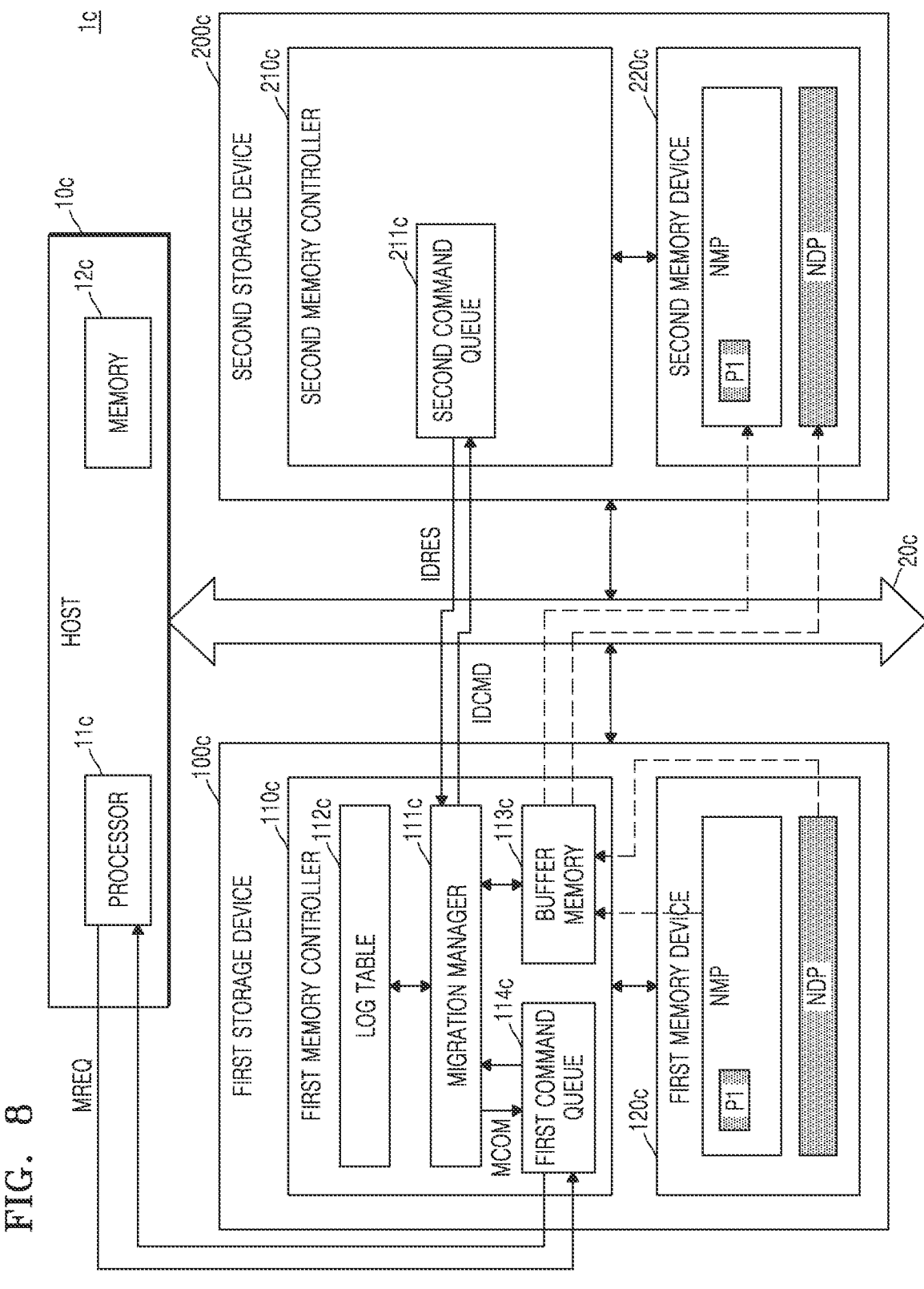
FIG. 8 is a block diagram illustrating data migration between storage devices according to an example embodiment.

FIG. 8 is a block diagram illustrating data migration between storage devices according to an example embodiment. Specifically, a first memory controller 110c of a first storage device 100c of FIG. 8 may further include a buffer memory 113c and a first command queue 114c. Source data NMP and dirty data NDP may be migrated from the first storage device 100c to the second storage device 200c through the buffer memory 113c of the first memory controller 110c. FIG. 8 will be described with reference to FIGS. 1, 2, and 5A to 5C, and redundant descriptions may be omitted.

FIG. 8 shows that only one piece of dirty data NDP is migrated, but this is an example and no dirty data NDP or more dirty data NDP may be generated according to the IO request signal of the host 10c and may be migrated.

The storage system 1c of FIG. 8 may correspond to the storage system 1 of FIG. 1. The storage system 1c may include a host 10c, a bus 20c, a first storage device 100c and a second storage device 200c. The bus 20c of FIG. 8 may correspond to the bus 20 of FIG. 1.

The host 10c of FIG. 8 may correspond to the host 10 of FIG. 1. The host 10c may include a processor 11c and a memory 12c.

The host 10c may generate the migration request signal MREQ in the processor 11c. The host 10c may transmit the migration request signal MREQ to the migration manager 111c through the first command queue 114c of the first storage device 100c. The processor 11c of the host 10c may receive the migration completion signal MCOM generated by the migration manager 111c through the first command queue 114c.

The first storage device 100c may correspond to the first storage device 100 of FIG. 1. The first storage device 100c may include a first memory controller 110c and a first memory device 120c. The first memory controller 110c may correspond to the first memory controller 110 of FIG. 1. The first memory controller 110c may include a log table 112c and a migration manager 111c.

The log table 112c may correspond to the log table 112 of FIG. 1. The migration manager 111c may correspond to the migration manager 111 of FIG. 1. After receiving the migration request signal MREQ from the host 10c, the migration manager 111c may generate the identification command IDCMD based on the received migration request signal MREQ. The migration manager 111c may transmit the identification command IDCMD to the second storage device 200c. The migration manager 111c may receive the response signal IDRES from the second storage device 200c.

The second storage device 200c may correspond to the second storage device 200 of FIG. 1. The second storage device 200c may include a second memory controller 210c and a second memory device 220c. The second memory controller 210c may correspond to the second memory controller 210 of FIG. 1. The second memory device 220c may correspond to the second memory device 220 of FIG. 1.

The second storage device 200c may include a second command queue 211c. In an example embodiment, the identification command IDCMD may be received from the first storage device 100c through the second command queue 211c. The second storage device 200c may transmit the response signal IDRES to the first storage device 100c through the second command queue 211c.

The identification command IDCMD may be transmitted from the first storage device 100c to the second storage device 200c through the bus 20c. The response signal IDRES may be transmitted from the second storage device 200c to the first storage device 100c through the bus 20c.

Source data NMP and dirty data NDP may be migrated from the first storage device 100c to the second storage device 200c through the buffer memory 113c of the first memory controller 110c and the bus 20c.

In an example embodiment, when the migration manager 111c receives the migration request signal MREQ from the host 10c, the migration manager 111c may control the source data NMP of the first storage device 100c to be transmitted to the second memory device 220c of the second storage device 200c through the buffer memory 113c of the first memory controller 110c and the bus 20c.

In an example embodiment, when the host 10c transmits the IO request signal to the first storage device 100c while the source data NMP is transmitted, the first storage device 100c may perform an operation corresponding to the IO request signal of the host 10c. In this process, the contents of the first page P1 included in the source data NMP may be changed, and dirty data NDP may be generated correspondingly. The migration manager 111c may control the first memory device 120c to transmit the dirty data NDP to the second storage device 200c. The dirty data NDP of the first storage device 100c may be transmitted to the second memory device 220c of the second storage device 200c through the buffer memory 113c of the first memory controller 110c and the bus 20c.

Figure 9:
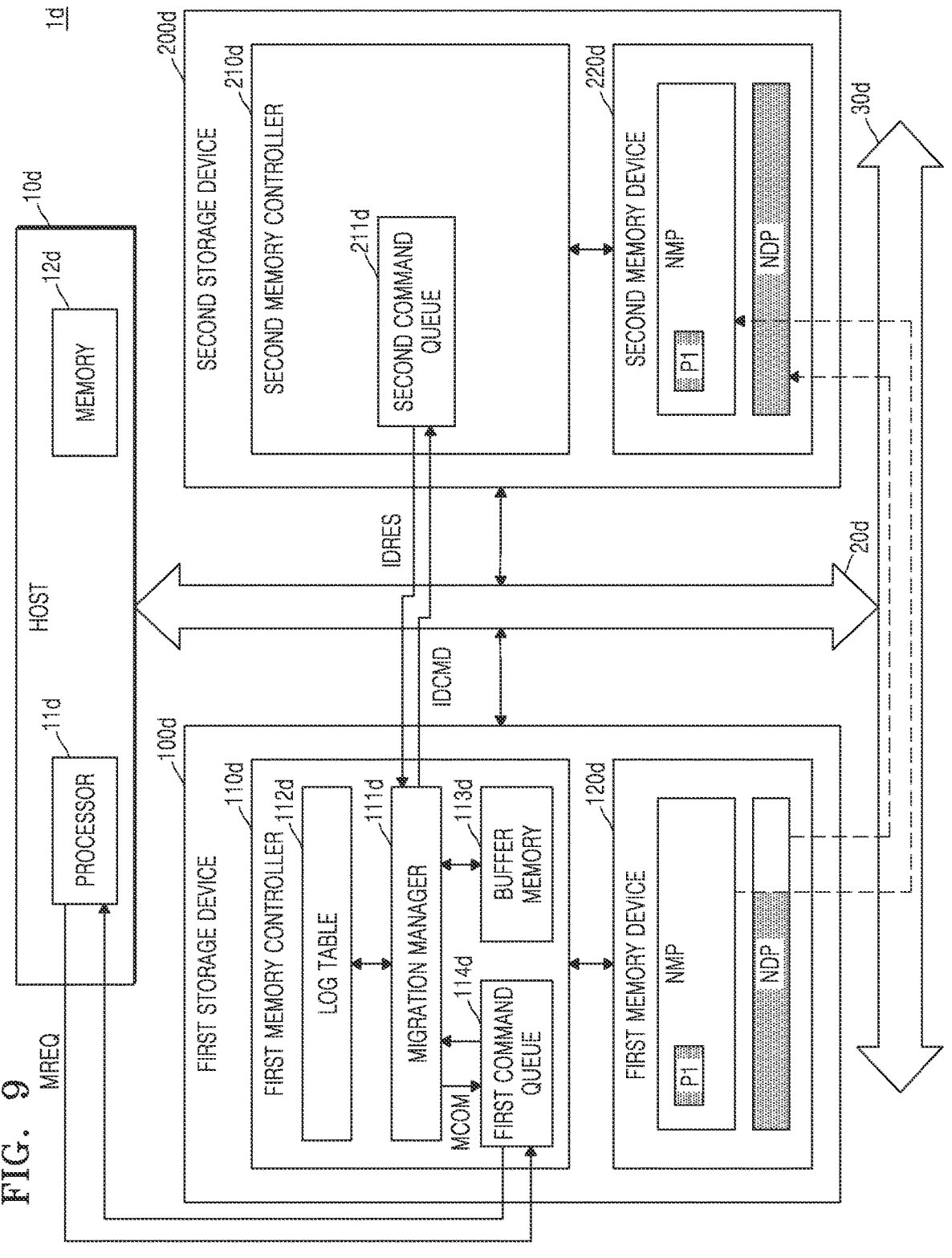
FIG. 9 is a block diagram illustrating data migration between storage devices according to an example embodiment.

FIG. 9 is a block diagram illustrating data migration between storage devices according to an example embodiment. Specifically, a first memory controller 110d of a first storage device 100d of FIG. 9 may further include a buffer memory 113d and a first command queue 114d. Source data NMP and dirty data NDP may be migrated from a first storage device 100d to a second storage device 200d through the buffer memory 113d of the first memory controller 110d. FIG. 9 will be described with reference to FIGS. 1, 2, and 5A to 5C, and redundant descriptions may be omitted.

FIG. 9 shows that only one piece of dirty data NDP is migrated, but this is an example and no dirty data NDP or more dirty data NDP may be generated according to the IO request signal of the host 10d and may be migrated.

The storage system 1d of FIG. 9 may correspond to the storage system 1 of FIG. 1. The storage system 1d may include a host 10d, a first bus 20d, a second bus 30d, a first storage device 100d, and a second storage device 200d. The first bus 20d of FIG. 9 may correspond to the bus 20 of FIG. 1.

The host 10d of FIG. 9 may correspond to the host 10 of FIG. 1. The host 10d may include a processor 11d and a memory 12d.

The host 10d may generate a migration request signal MREQ in the processor 11d. The host 10d may transmit the migration request signal MREQ to the migration manager 111d through the first command queue 114d of the first storage device 100d. The processor 11d of the host 10d may receive the migration completion signal MCOM generated by the migration manager 111d through the first command queue 114d.

The first storage device 100d may correspond to the first storage device 100 of FIG. 1. The first storage device 100d may include a first memory controller 110d and a first memory device 120d. The first memory controller 110d may correspond to the first memory controller 110 of FIG. 1. The first memory controller 110d may include a log table 112d and a migration manager 111d.

The log table 112d may correspond to the log table 112 of FIG. 1. The migration manager 111d may correspond to the migration manager 111 of FIG. 1. After receiving the migration request signal MREQ from the host 10d, the migration manager 111d may generate the identification command IDCMD based on the received migration request signal MREQ. The migration manager 111d may transmit the identification command IDCMD to the second storage device 200d. The migration manager 111d may receive the response signal IDRES from the second storage device 200d.

The second storage device 200d may correspond to the second storage device 200 of FIG. 1. The second storage device 200d may include a second memory controller 210d and a second memory device 220d. The second memory controller 210d may correspond to the second memory controller 210 of FIG. 1. The second memory device 220d may correspond to the second memory device 220 of FIG. 1.

The second storage device 200d may include a second command queue 211d. In an example embodiment, the identification command IDCMD may be received from the first storage device 100d through the second command queue 211d. The second storage device 200d may transmit the response signal IDRES to the first storage device 100d through the second command queue 211d.

The identification command IDCMD may be transmitted from the first storage device 100d to the second storage device 200d through the first bus 20d. The response signal IDRES may be transmitted from the second storage device 200d to the first storage device 100d through the first bus 20d.

The first storage device 100d and the second storage device 200d may be electrically connected to the second bus 30d. In this regard, source data NMP and dirty data NDP may be migrated from the first storage device 100d to the second storage device 200d through the buffer memory 113d of the first memory controller 110d and the second bus 30d. In an example embodiment, the second bus 30d may transmit data according to the same protocol as the first bus 20d. In an example embodiment, the second bus 30d may be a bus operating based on the PCI-E protocol or the NVMe-oF protocol.

The second bus 30d may have a bandwidth independent of the bandwidth of the first bus 20d used for communication between the host 10d and the first storage device 100d. Accordingly, data may be transmitted from the first storage device 100d to the second storage device 200d without being limited by the bandwidth of the first bus 20d.

In an example embodiment, when the migration manager 111d receives the migration request signal MREQ from the host 10d, the migration manager 111d may control the source data NMP of the first storage device 100d to be transmitted to the second memory device 220d of the second storage device 200d through the buffer memory 113d of the first memory controller 110d and the second bus 30d.

In an example embodiment, when the host 10d transmits the IO request signal to the first storage device 100d while the source data NMP is transmitted, the first storage device 100d may perform an operation corresponding to the IO request signal of the host 10d. In this process, the contents of the first page P1 included in the source data NMP may be changed, and dirty data NDP may be generated correspondingly. The migration manager 111d may control the first memory device 120d to transmit the dirty data NDP to the second storage device 200d. The dirty data NDP of the first storage device 100d may be transmitted to the second memory device 220d of the second storage device 200d through the buffer memory 113d of the first memory controller 110d and the second bus 30d.

Figure 10:
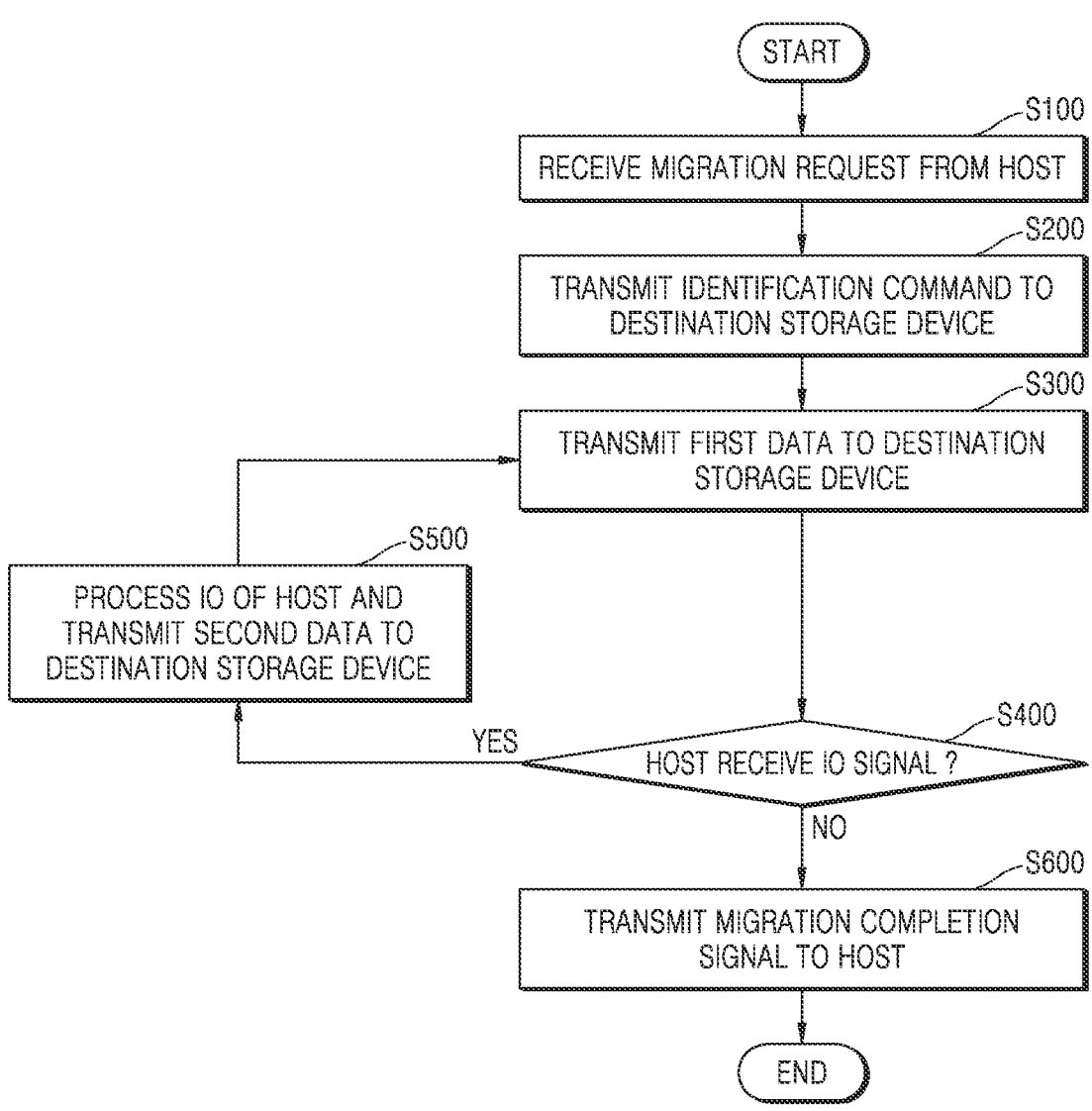
FIG. 10 is a flowchart illustrating an operating method of a storage device according to an example embodiment.

FIG. 10 is a flowchart illustrating an operating method of a storage device according to an example embodiment. FIG. 10 will be described with reference to FIGS. 1 and 5A to 5C, and redundant descriptions may be omitted.

In S100, the migration manager 111 may receive the migration request signal MREQ from the host 10.

In S200, the migration manager 111 may generate the identification command IDCMD based on the migration request signal MREQ. The migration manager 111 may transmit the identification command IDCMD to the destination storage device. A detailed description of S200 is described below with reference to FIG. 11.

In an example embodiment, the migration manager 111 may transmit the identification command IDCMD to the second storage device 200.

In S300, the migration manager 111 may transmit the source data NMP to the destination storage device. In an example embodiment, the migration manager 111 may transmit the source data NMP to the destination storage device based on the response signal IDRES received from the destination storage device.

In S400, the first storage device 100 may receive an IO request of the host 10 by receiving the IO request signal from the host 10 while the source data NMP is transmitted to the destination storage device. In this regard, an operation corresponding to the IO request signal may be performed even while the source data NMP is transmitted.

In an example embodiment, when the IO request signal is received from the host 10 while the source data NMP is being transmitted from the first storage device 100 to the second storage device 200, the first storage device 100 may transmit the source data NMP to the second storage device 200 and simultaneously perform an operation corresponding to the IO request signal from the host 10.

In an example embodiment, when the IO request signal is not received from the host 10 while the source data NMP is being transmitted from the first storage device 100 to the second storage device 200, the first storage device 100 may perform a migration operation until transmission of the source data NMP to the second storage device 200 is completed.

In S500, when the IO request signal is received from the host 10 while the source data NMP is being transmitted from the first storage device 100 to the second storage device 200, the first storage device 100 may perform an operation corresponding to the IO request signal of the host 10. The first storage device 100 may transmit, to the second storage device 200, dirty data NDP generated by performing an operation corresponding to the IO request signal of the host 10.

In S600, when migration of the source data NMP and the dirty data NDP from the first storage device 100 to the second storage device 200 is completed, the migration manager 111 may transmit a migration completion signal MCOM to the host 10.

Figure 11:
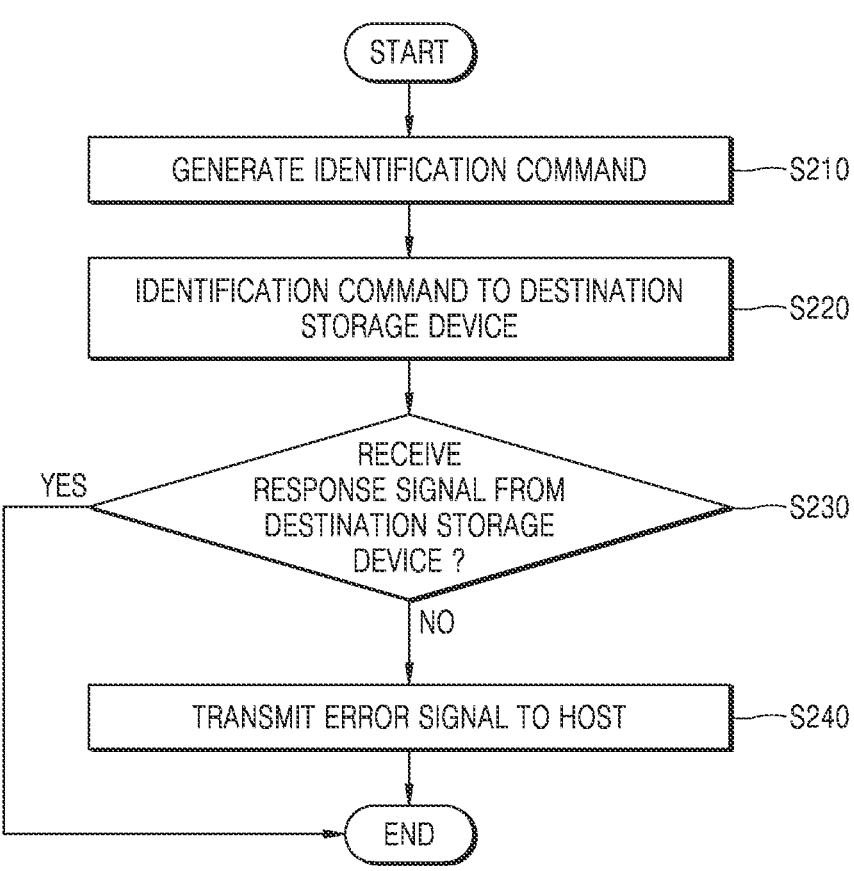
FIG. 11 is a flowchart illustrating a method of transmitting an identification command from a storage device to a destination storage device according to an example embodiment.

FIG. 11 is a flowchart illustrating a method of transmitting an identification command from a storage device to a destination storage device according to an example embodiment. Specifically, FIG. 11 is a flowchart illustrating S200 of FIG. 10 in detail. FIG. 11 will be described with reference to FIGS. 1, 5A to 5C, and 10, and redundant descriptions may be omitted.

In S210, based on the migration request signal MREQ of the host 10, the migration manager 111 may generate the identification command IDCM.

In S220, the migration manager 111 may transmit the identification command IDCMD to the destination storage device. In an example embodiment, the migration manager 111 may transmit the identification command IDCMD to the second storage device 200.

In S230, the migration manager 111 may determine whether the response signal IDRES is received from the destination storage device.

In an example embodiment, the migration manager 111 may receive the response signal IDRES from the second storage device 200. The migration manager 111 may initiate a migration operation by controlling the source data NMP to be transmitted to the second storage device 200 when detecting that the response signal IDRES is received from the destination storage device.

In S240, when the migration manager 111 does not receive the response signal IDRES from the destination storage device, the migration manager 111 may transmit an error signal to the host 10.

Figure 12:
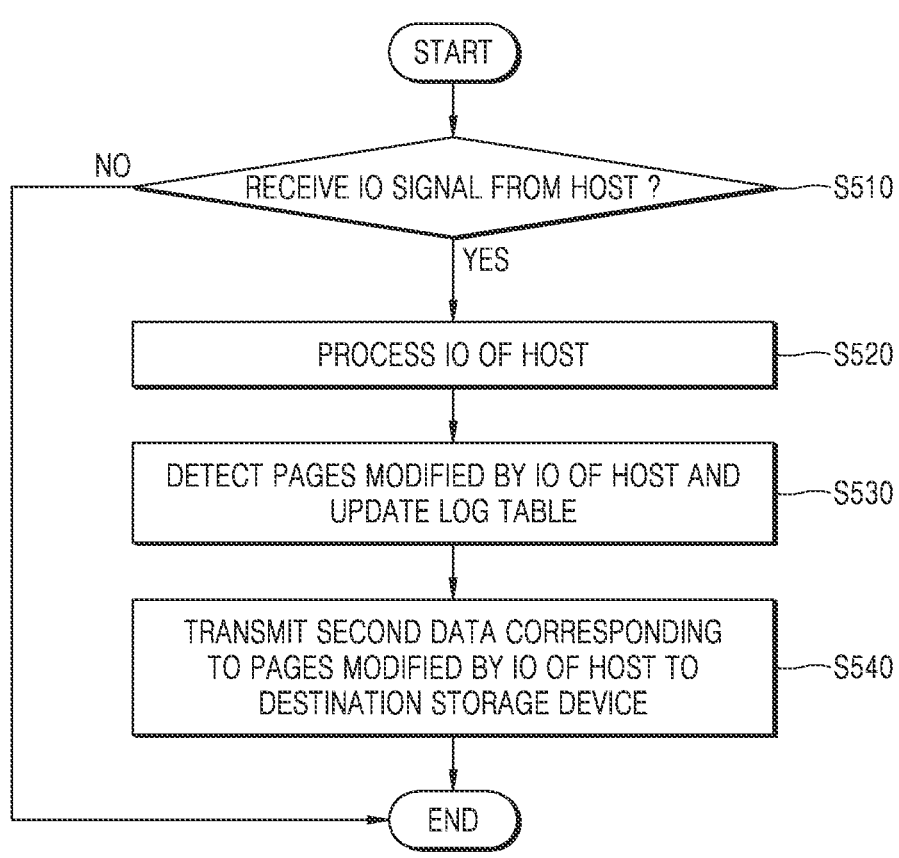
FIG. 12 is a flowchart illustrating a method of processing input/output (IO) of a host and transmitting dirty data to a destination storage device by a storage device according to an example embodiment.

FIG. 12 is a flowchart illustrating a method of processing IO of a host and transmitting dirty data to a destination storage device by a storage device according to an example embodiment. Specifically, FIG. 12 is a flowchart illustrating S500 of FIG. 10 in detail. FIG. 12 will be described with reference to FIGS. 1, 5A to 5C, and 10, and redundant descriptions may be omitted.

In S510, while migrating source data NMP or dirty data NDP from the first storage device 100 to the destination storage device, the first storage device 100 may detect whether an IO request signal is received from the host 10. When the IO request signal is not received from the host 10, the first storage device 100 may continue to perform a migration operation until the migration is completed.

In S520, when the IO request signal is received from the host 10, the first storage device 100 may process the IO request of the host 10. That is, the first storage device 100 may perform an operation corresponding to the IO request signal of the host 10. For example, the first storage device 100 may perform read, program, and erase operations on the source data NMP.

In S530, the migration manager 111 may detect when the source data NMP is changed due to the operation performed corresponding to the IO request signal from the host 10. That is, for each of a plurality of pages included in the source data NMP, the migration manager 111 may detect whether the page has been changed by IO of the host 10. The migration manager 111 may record change information of the detected pages in the log table 112, and thus the log table 112 may be updated by the migration manager 111.

In an example embodiment, as the operation corresponding to the IO request signal from the host 10 is performed, the first page P1, which is a page included in the source data NMP, may be changed, and dirty data NDP may be generated in the process. The migration manager 111 may update the log table 112 by recording address information of the dirty data NDP in the log table 112 together with information indicating that the first page P1 has been changed.

In S540, referring to the log table 112, the migration manager 111 may transmit newly generated dirty data NDP due to the IO request of the host 10 and change information included in the log table 112 to the destination storage device.

In an example embodiment, referring to the log table 112, the migration manager 111 may transmit newly generated dirty data NDP due to the IO request of the host 10 and change information included in the log table 112 to the second storage device 200. The second storage device 200 may detect changed pages in the source data NMP through the dirty data NPD received from the first storage device 100 and the change information included in the log table 112.

Figure 13:
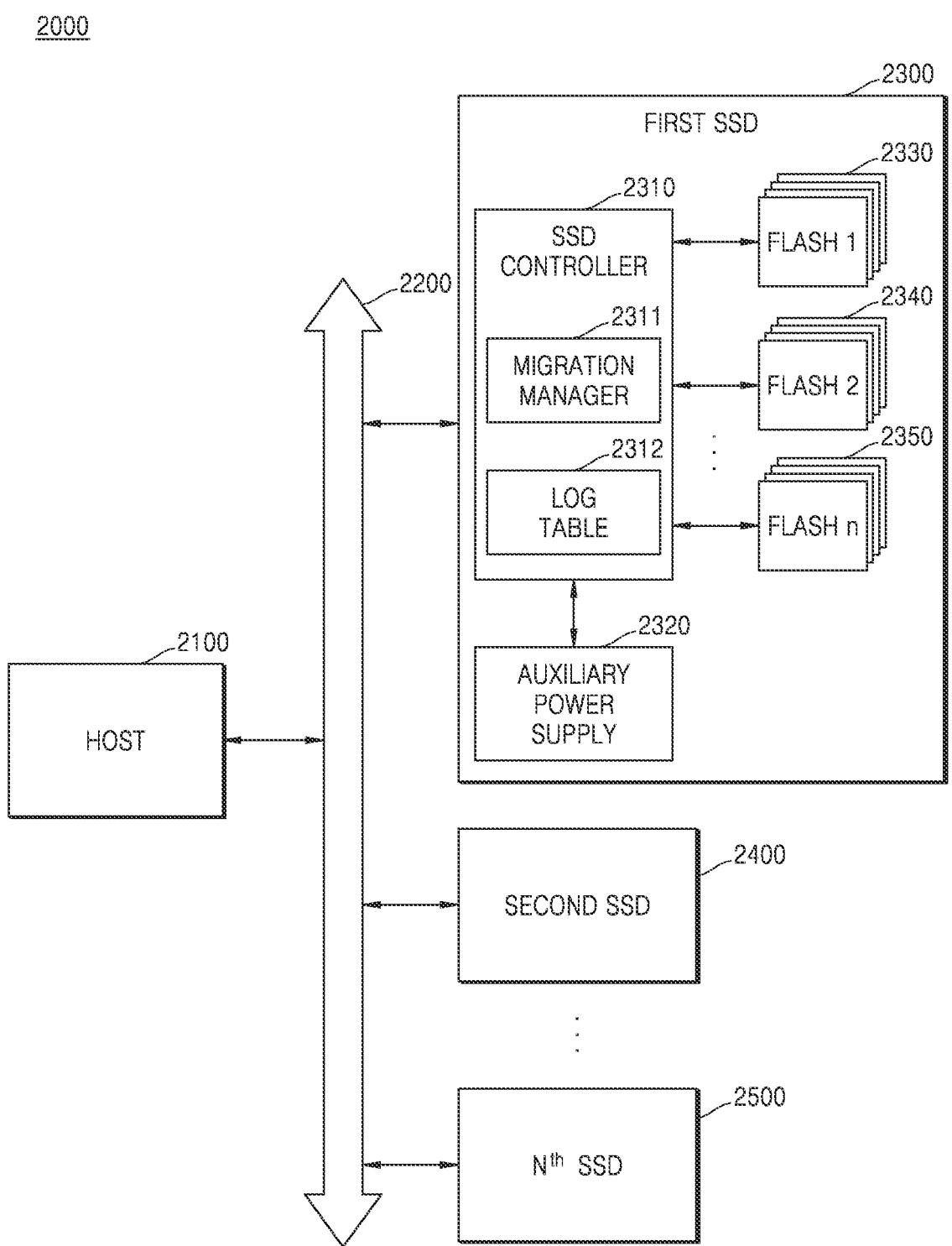
FIG. 13 is a block diagram illustrating an example of applying a storage device to a storage system according to example embodiments.

FIG. 13 is a block diagram illustrating an example of applying a storage device according to example embodiments to a storage system.

Referring to FIG. 13, a storage system 2000 may include a host 2100, a bus 2200, a first SSD 2300, and a second SSD 2400 to $N^{th}$ SSD 2500.

The first SSD 2300 may include an SSD controller 2310, an auxiliary power supply 2320, and memory devices 2330, 2340, and 2350. The first SSD 2300 may be implemented using example embodiments described above with reference to FIGS. 1 to 12. Although not shown in the drawings, the second SSD 2400 to the N<sup>th</sup> SSD 2500 may also have a structure similar to that of the first SSD 2300.

The SSD controller 2310 of the first SSD 2300 may include a migration manager 2311 and a log table 2312. The first SSD 2300 may receive a migration request signal from the host 2100 through the migration manager 2311, and correspondingly may transmit data stored in the memory devices 2330, 2340, and 2350 to at least one SSD among the second SSD 2400 to the N<sup>th</sup> SSD 2500. After data migration is completed, the first SSD 2300 may transmit a migration completion signal to the host 2100.

The first SSD 2300 may perform data migration between different SSDs through the migration manager 2311, thereby reducing the load on the host 2100. As a result, performance of the storage system 2000 may be improved.

In some example embodiments, each of the components represented by a block as illustrated in FIGS. 1-3, 5A, 5B, 5C, 6-9 and 13 may be implemented as various numbers of hardware, software and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using use a direct circuit structure, such as a memory, a processor, a logic circuit, a look-up table, etc., that may execute the respective functions through controls of one or more microprocessors or other control apparatuses. Also, at least one of these components may include a module, a program, or a part of code, which contains one or more executable instructions for performing specified logic functions, and executed by one or more microprocessors or other control apparatuses. Also, at least one of these components may further include or may be implemented by a processor such as a central processing unit (CPU) that performs the respective functions, a microprocessor, or the like. Functional aspects of example embodiments may be implemented in algorithms that execute on one or more processors. Furthermore, the components, elements, modules or units represented by a block or processing steps may employ any number of related art techniques for electronics configuration, signal processing and/or control, data processing and the like.

While aspects of example embodiments have been particularly shown and described, it will be understood that various changes in form and details may be made therein without departing from the spirit and scope of the following claims.

What is claimed is:

1. A method of operating a storage device including a migration manager, the method comprising:
receiving a migration request from a host;
based on the migration request being received from the host, recording, in a log table, initial states of source data corresponding to the migration request in association with address information of the source data, wherein the log table and the source data are stored in the storage device;
transmitting an identification command to a destination storage device based on the migration request;
transmitting first data to the destination storage device according to a response signal of the destination storage device;

based on an input/output (IO) signal being received from the host while the first data is being transmitted by the storage device to the destination storage device, the IO signal indicating an operation to generate second data based on the first data:
storing the second data in the storage device, and
updating the log table by:
recording address information of the second data in association with the address information of the source data, and
modifying the initial states in the log table that are associated with the source data used in the operation, wherein the modified states indicate which pages of the source data have been changed by the operation;
transmitting the second data to the destination storage device based on the updated log table; and
transmitting a migration completion signal to the host after completing transmission of the first data and the second data to the destination storage device.

2. The method of claim 1, wherein the first data comprises a plurality of pages in the storage device and the second data comprises at least one dirty page in the storage device, and
wherein the method further comprises storing, in the log table:
addresses of memory pages, among the plurality of pages in the storage device, modified by the operation, and
addresses of dirty pages in the storage device included in the second data.

3. The method of claim 1, wherein the storage device further comprises a buffer memory, and
wherein the method further comprises:
controlling the storage device to communicate with the destination storage device through a bus; and
transmitting the first data and the second data to the destination storage device through the buffer memory and the bus.

4. The method of claim 1, wherein a command queue is provided in the storage device, and
wherein the receiving of the migration request from the host comprises receiving the migration request from the host through the command queue.

5. The method of claim 4, wherein the transmitting of the identification command to the destination storage device comprises:
generating the identification command based on an identifier included in the migration request;
transmitting the identification command to the destination storage device; and
transmitting an error signal to the host based on a response signal not arriving.

6. The method of claim 1, wherein the first data comprises a plurality of pages in the storage device and the second data comprises at least one dirty page in the storage device, and
wherein the transmitting the second data comprises:
performing the operation corresponding to the IO signal when the IO signal is received from the host;
detecting pages, among the plurality of pages, modified by the operation; and
updating the log table based on addresses of the detected pages and the at least one dirty page.

7. A storage device for migrating data to a destination storage device, the storage device comprising:
a memory device; and
a memory controller configured to:

generate an identification command according to a migration request received from a host, based on the migration request being received from the host, record, in a log table, initial states of source data corresponding to the migration request in association with address information of the source data, wherein the log table and the source data are stored in the storage device;

transmit the identification command to the destination storage device, transmit first data stored in the memory device to the destination storage device according to a response signal of the destination storage device, based on an input/output (IO) signal being received from the host while the first data is being transmitted by the storage device to the destination storage device, the IO signal indicating an operation to generate second data based on the first data:

store the second data in the storage device; and update the log table by:

recording address information of the second data in association with the address information of the source data, and modifying the initial states in the log table that are associated with the source data used in the operation, wherein the modified states indicate which pages of the source data have been changed by the operation;

transmit the second data to the destination storage device based on the updated log table; and transmit a migration completion signal to the host after completing transmission of the first data and the second data to the destination storage device.

8. The storage device of claim 7, wherein the memory controller is further configured to divide the first data into a plurality of pieces of data, compress the first data and the second data, and transmit the compressed data to the destination storage device.

9. The storage device of claim 7, wherein the identification command comprises an identifier indicating the destination storage device.

10. The storage device of claim 7, wherein the memory controller comprises a buffer memory, and wherein the memory controller is further configured to control the first data and the second data to be transmitted to the destination storage device through the buffer memory.

11. The storage device of claim 10, wherein the storage device is electrically connected to a first bus, and wherein the memory controller is further configured to control the identification command, the first data, and the second data to be transmitted to the destination storage device through the buffer memory and the first bus.

12. The storage device of claim 10, wherein the storage device is electrically connected to a first bus and a second bus, and wherein the memory controller is further configured to control:

the identification command to be transmitted to the destination storage device through the first bus, and the first data and the second data to be transmitted to the destination storage device through the second bus.

13. The storage device of claim 7, wherein a command queue is provided in the memory controller, and wherein the memory controller is further configured to control:

the migration request to be received by the storage device through the command queue, and the migration completion signal to be transmitted to the host through the command queue.

14. The storage device of claim 13, wherein the command queue comprises a first queue and a second queue, wherein the migration request is received through the first queue, and wherein the memory controller is further configured to control the migration completion signal to be transmitted through the second queue.

15. The storage device of claim 7, wherein the memory controller is further configured to:

generate the identification command based on an identifier included in the migration request, transmit the identification command to the destination storage device, and transmit an error signal to the host based on the response signal not being received.

16. The storage device of claim 7, wherein the first data comprises a plurality of pages in the storage device and the second data comprises at least one dirty page in the storage device, and wherein the memory controller is further configured to store, in the log table:

addresses of pages, among the plurality of pages, modified by the operation, and addresses of dirty pages included in the second data.

17. The storage device of claim 16, wherein the memory controller is further configured to:

perform the operation based on the IO signal being received from the host, detect the modified pages, and update the log table based on addresses of the detected pages and of the dirty pages.

18. A storage system comprising:

a first storage device;

a second storage device; and a host, wherein the first storage device comprises:

a memory device; and a memory controller configured to:

based on a migration request being received by the first storage device from the host, record, in a log table, initial states of source data corresponding to the migration request in association with address information of the source data, wherein the log table and the source data are stored in the first storage device, generate an identification command according to the migration request, transmit the identification command from the first storage device to the second storage device through the host, transmit first data stored in the first storage device to the second storage device through the host according to a response signal of the second storage device, based on an input/output (IO) signal being received by the first storage device from the host while the first data is being transmitted by the first storage device to the second storage device, the IO signal indicating an operation to generate second data based on the first data, update the log table by:

recording address information of the second data in association with the address information of the source data, and modifying the initial states in the log table that are associated with the source data used in the operation, wherein the modified states indicate which pages of the source data have been changed by the operation, transmit the second data to the second storage device based on the updated log table, and transmit a migration completion signal to the host after transmission of the first data and the second data is completed, and wherein the first data and the second data are transmitted through the host.

19. The storage system of claim 18, wherein the first data comprises a plurality of pages and the second data comprises at least one dirty page, and wherein the memory controller is further configured to store, in the log table:

addresses of pages, among the plurality of pages, modified by the operation, and addresses of dirty pages included in the second data.

20. The storage system of claim 18, wherein the memory controller further comprises a buffer memory, and wherein the memory controller is further configured to control the first data and the second data to be transmitted to the second storage device through the buffer memory.

\* \* \* \* \*